United States Patent
Takagi et al.

(10) Patent No.: US 10,712,586 B2
(45) Date of Patent: Jul. 14, 2020

(54) OPTICAL DEVICE AND OPTICAL SYSTEM

(71) Applicant: OMRON Corporation, Kyoto (JP)

(72) Inventors: Yoshihiko Takagi, Kyoto (JP);
Norikazu Kitamura, Osaka (JP);
Mitsuru Okuda, Aichi (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/220,842

(22) Filed: Dec. 14, 2018

(65) Prior Publication Data
US 2019/0137772 A1 May 9, 2019

Related U.S. Application Data

(63) Continuation of application No. PCT/JP2017/022232, filed on Jun. 15, 2017.

(30) Foreign Application Priority Data

Jul. 19, 2016 (JP) .................. 2016-141844

(51) Int. Cl.
G02B 27/22 (2018.01)
G02B 3/08 (2006.01)
(Continued)

(52) U.S. Cl.
CPC ............... G02B 30/27 (2020.01); F21S 2/00 (2013.01); G02B 3/08 (2013.01); G02B 6/0035 (2013.01);
(Continued)

(58) Field of Classification Search
CPC ...... G02B 6/0035; G02B 30/00; G02B 30/27; G02B 30/35; G02B 35/24; G09F 13/18; G09F 19/12; F21S 2/00
See application file for complete search history.

(56) References Cited

U.S. PATENT DOCUMENTS 9,400,395 B2 * 7/2016 Travers ................ G03H 1/2294
10,114,225 B2 * 10/2018 Kim ...................... H04N 13/366
(Continued)

FOREIGN PATENT DOCUMENTS

| JP | 2001-255493 A | 9/2001 |
|---|---|---|
| JP | 5701434 B1 | 4/2015 |
| JP | 5861797 B1 | 2/2016 |

OTHER PUBLICATIONS

International Search Report issued in Application No. PCT/JP2017/022232, dated Sep. 5, 2017 (1 page).
(Continued)

Primary Examiner — Daniel Petkovsek
(74) Attorney, Agent, or Firm — Osha Liang LLP

(57) ABSTRACT

An optical device includes a light guide plate configured to guide light within a plane parallel to an emission surface, and a plurality of deflectors configured to deflect light guided thereto by the light guide plate, causing light forming an image in a space outside the light guide plate to exit from the emission surface. Each deflector in the plurality of deflectors cause the light to exit from the emission surface toward a direction substantially converging onto a single convergence point or convergence line in the space, or to substantially radiate from a single convergence point or convergence line in the space. The convergence point or the convergence line is mutually different among the plurality of deflectors with a grouping of a plurality of the convergence points or the convergence lines forming the image in the space.

16 Claims, 33 Drawing Sheets

(51) Int. Cl.
*G02B 30/27* (2020.01)
*F21S 2/00* (2016.01)
*G09F 13/18* (2006.01)
*G09F 19/12* (2006.01)
*G02B 30/00* (2020.01)
*G02B 30/35* (2020.01)
*F21V 8/00* (2006.01)
*G03B 35/24* (2006.01)

(52) U.S. Cl.
CPC ............. *G02B 30/00* (2020.01); *G02B 30/35* (2020.01); *G03B 35/24* (2013.01); *G09F 13/18* (2013.01); *G09F 19/12* (2013.01)

(56) References Cited

U.S. PATENT DOCUMENTS

| | | | |
|---|---|---|---|
| 10,139,640 B2* | 11/2018 | Shinohara | G02B 6/0023 |
| 10,317,691 B2* | 6/2019 | Raymond | G03B 25/00 |
| 2001/0022562 A1 | 9/2001 | Ishikawa | |
| 2004/0217920 A1 | 11/2004 | Ishikawa | |
| 2010/0157400 A1* | 6/2010 | Dimov | G02B 27/0172 359/13 |
| 2014/0268327 A1 | 9/2014 | Dunn et al. | |
| 2017/0192244 A1* | 7/2017 | Shinohara | G02B 6/003 |
| 2019/0317266 A1* | 10/2019 | Shinohara | G02B 6/0038 |

OTHER PUBLICATIONS

Written Opinion issued in International Application No. PCT/JP2017/022232, dated Sep. 5, 2017 (5 pages).

Office Action in counterpart Japanese Patent Application No. 2016-141844 dated Aug. 27, 2019 (5 pages).

* cited by examiner

130

190

231

OPTICAL DEVICE AND OPTICAL SYSTEM

BACKGROUND

Field

The present invention relates to an optical device and an optical system.

Related Art

A display device that presents a two-dimensional image stereoscopically is known from, for example, Japanese Patent Publication No. 2001-255493. More specifically, the display device is made up of a display unit provided with an image display surface that shows a two-dimensional image, and a microlens array separated from the image display surface. The light emitted from the image display surface creates an image in an image forming plane located on the side of the display unit opposite the microlens array, and thus presents the two-dimensional image stereoscopically.

Light beams for producing an image outside a light guide plate may be provided via a plurality of deflectors provided in the light guide plate for deflecting light in the light guide. Here, the manufacturing cost of the light guide plate increases with the size of the surface area on the light guide plate filled with the deflectors. The ability of the light guide plate to transmit light also decreases with size of the surface area on the light guide plate filled with the deflectors.

SUMMARY

A first embodiment provides an optical device. The optical device may include a light guide plate configured to guide light within a plane parallel to an emission surface. The optical device may include a plurality of deflectors configured to deflect light guided thereto by the light guide plate, causing light forming an image in a space outside the light guide plate to exit from the emission surface. Each deflector in the plurality of deflectors may cause the light to exit from the emission surface toward a direction substantially converging onto a single convergence point or convergence line in the space, or to substantially radiate from a single convergence point or convergence line in the space. The convergence point or the convergence line may be mutually different among the plurality of deflectors with a grouping of a plurality of the convergence points or the convergence lines forming the image in the space. Each deflector in the plurality of deflectors may be configured such that any of the light rays in the light emitted from the emission surface via the deflector passes through a specific observation position in the space. At least one of the deflectors among the plurality of deflectors may be configured such that given a first line connecting one edge of the deflector and the convergence point or convergence line and a second line connecting the convergence point or the convergence line to the observation position, the first line is located between where the second line or an extension thereof intersects with the light guide plate and the one edge of said deflector so that the first line and the second line form no more than a predetermined angle within a plane orthogonal to the direction along which light is guided by the light guide plate.

Each deflector in the plurality of deflectors may be configured such that given a third line connecting another edge of at least one deflector and the convergence point or convergence line, the third line is located between where the second line or an extension thereof intersects with the light guide plate and the other edge of the deflector so that the third line and the second line form no more than a predetermined angle within a plane orthogonal to the direction along which light is guided by the light guide plate.

Each deflector in the plurality of deflectors may be formed along a predetermined line within a plane parallel to the emission surface.

At least one of the deflectors in the plurality of deflectors may include a first segment near one edge and the second segment near the other edge, the first segment and the second segment situated about a position corresponding to the optical axis of light converging toward or radiating from the convergence point or convergence line in a plane orthogonal to the direction along which light is guided by the light guide plate; and the light emitted from the first segment and the light emitted from the second segment may be asymmetrical about the optical axis.

At least one of the deflectors in the plurality of deflectors may include a first segment near one edge and the second segment near the other edge, the first segment and the second segment situated about a position corresponding to the optical axis of light converging toward or radiating from the convergence point or convergence line in a plane orthogonal to the direction along which light is guided by the light guide plate; and the length of the first segment in a direction parallel to the emission surface and the length of the second segment in a direction parallel to the emission surface may be asymmetrical in a plane orthogonal to the direction along which light is guided by the light guide plate.

The light guided by the light guide plate may be substantially parallel in a plane parallel to the emission surface; the first segment and the second segment may each include a plurality of deflection surfaces configured to deflect light incident thereon; and the plurality of deflection surfaces in the first segment and the plurality of deflection surfaces in the second segment may be oriented asymmetrically about a position corresponding to a line connecting the convergence point or a convergence line and the observation position.

The degree of said asymmetry for a deflector located near one edge of the light guide plate may be greater than the degree of said asymmetry for a deflector located near the center of the light guide plate.

A second embodiment provides an optical device. The optical device may include a light guide plate configured to guide light within a plane parallel to an emission surface. The optical device may include a plurality of deflectors arranged two-dimensionally in a plane parallel to the emission surface and each deflector configured to deflect light guided thereto by the light guide plate, causing light forming an image in a space to exit from the emission surface. Each deflector in the plurality of deflectors may be configured to spread the light incident thereon into light with an intensity distribution corresponding to the image in a direction orthogonal to the light guide direction of the light guide plate in a plane parallel to the emission surface and cause the emission surface to output said light such that grouping the light from a plurality of the deflectors arranged along a direction orthogonal to the light guide direction thereby forms the light radiating from the image. Each deflector in the plurality of deflectors may be configured such that any of the light rays in the light emitted from the emission surface via the deflector passes through a specific observation position in the space.

A third embodiment provides an optical device. The optical device may include a light guide plate configured to guide light within a plane parallel to an emission surface.

The optical device may include a plurality of deflectors arranged two-dimensionally in a plane parallel to the emission surface and each deflector configured to deflect light guided thereto by the light guide plate, causing light forming an image in a space to exit from the emission surface. Each deflector in the plurality of deflectors may be configured to spread the light incident thereon two-dimensionally into light with an intensity distribution corresponding to the image and cause the emission surface to output said light such that grouping the light from three or more deflectors arranged on different straight lines thereby forms the light radiating from the image. and Each deflector in the plurality of deflectors may be configured such that any of the light rays in the light emitted from the emission surface via the deflector passes through a specific observation position in the space.

One deflector among the plurality of deflectors may be provided on a line or an extension thereof that connects any point in the image and the observation position.

Each deflector in the plurality of deflectors may include one or a plurality of groups of deflection surfaces inclined relative to the emission surface on the outer surface or on the inside of the light guide plate and configured to reflect, refract, or diffract light guided thereto by the light guide plate.

At least one of the deflection surfaces may be configured to include a plurality of flat or curved surfaces oriented in different directions.

At least one of the deflection surfaces may be extended, bent, or curved in a direction orthogonal to the light guide direction of the light guide plate when the deflection surface is projected onto a surface parallel to the emission surface.

The optical device may further include a light source configured to emit light that is guided by the light guide plate.

Note that the above summary does not list all the features of the present invention; and, sub-combinations of these sets of features also fall within the scope of the invention.

DETAILED DESCRIPTION

Embodiments of the present invention are described below with reference to the drawings. However, the present invention is not limited to the below embodiments. All combinations of the features described in the embodiments are not necessarily required. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
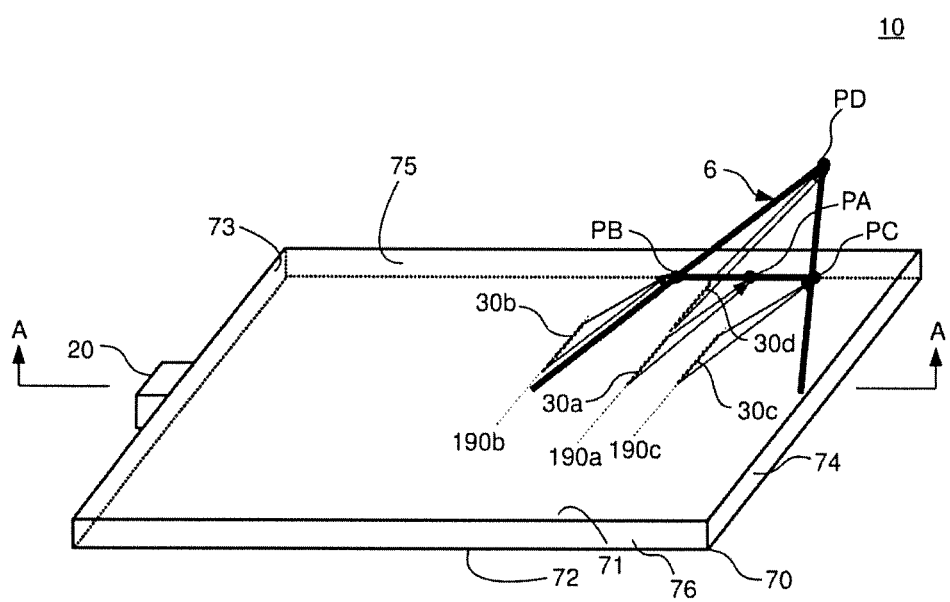
FIG. 1 is a schematic view of a display device 10 according to a first embodiment along with a three-dimensional image projected into a space.

FIG. 1 is a schematic view of a display device 10 according to a first embodiment along with a three dimensional image projected onto a space. The drawings used for describing the embodiment are general and schematic in nature in order to provide a clear explanation. In some cases, the drawings are not to scale. The drawings that include a three-dimensional image are not necessarily drawn from the point of view of an observer and may be drawn from a different perspective to ensure the location of the image in a space is easy to understand.

The display device 10 is provided with a light guide plate 70 and a light source 20. The light guide plate 70 is a transparent resin material with a relatively high index of refraction. The light guide plate 70 may be produced from, for instance, a polycarbonate resin (PC), a poly methyl methacrylate resin (PMMA), glass or the like. The light guide plate 70 is one example of the optical device. The display device 10 is an example of an optical system.

The light guide plate 70 includes an emission surface 71 that outputs light. The emission surface 71 acts as the display surface of the display device 10. The display device 10 uses light emitted from the emission surface 71 to produce a three-dimensional image 6. The image 6 is a three-dimensional image perceived by the user in a space. Note that, the term three-dimensional image refers to an image that appears to be at a location that is different from the emission surface 71 of light guide plate 70. The term three-dimensional image also includes a two-dimensional image perceived at a location away from the emission surface 71, for instance. In other words, the term "three-dimensional image" does not refer only to an image perceived as having a solid shape, but also includes an image in two-dimensional form perceived at a different location than on the display surface of the display device 10.

The light guide plate 70 includes a rear surface 72 on the opposite side of the emission surface 71. The emission surface 71 is one principal surface of the light guide plate 70 and the rear surface 72 is the other principal surface. The light guide plate 70 also includes edges on the four sides thereof, i.e. a first edge 73, a second edge 74, a third edge 75, and a fourth edge 76. The first edge 73 is the incidence end surface of the light guide plate 70. A light source 20 is provided at the first edge 73, where light from the light source 20 enters the light guide plate 70 from the first edge 73. The second edge 74 is opposite the first edge 73. The fourth edge 76 is opposite the third edge 75.

A rectangular coordinate system, and in particular the right-handed system of x axis, y axis, and z axis is used at some points to describe the embodiments. Here the z axis direction is a direction perpendicular to the emission surface 71. The positive z axis direction is defined as the direction from the rear surface 72 to the emission surface 71. The y axis direction is a direction perpendicular to the first edge 73. The positive y axis direction is defined as the direction from the first edge 73 to the second edge 74. The x axis direction is the direction perpendicular to the third edge 75 and the fourth edge 76; and the positive x axis direction is defined as the direction from the third edge 75 to the fourth edge 76. To avoid redundancy in the description, planes parallel to the xy, yz, and xz planes are sometimes referred to as the xy plane, yz plane, and the xz plane, respectively.

The light source 20 may be an LED light source. The optical axis of the light source 20 is substantially parallel to the y axis. Light from the light source 20 enters via the first edge 73. Light from the light source 20 entering via the first stage 73 is totally reflected between the emission surface 71 on the rear surface 72, and travels through the light guide plate while spreading within a plane in the light guide plate 70. The center of the light guided by the light guide plate 70 is substantially parallel to the y axis. Thus, the light guide plate 70 guides light from the light source 20 such that the light spreads out in planar form in a plane parallel to the emission surface 71. A light beam guided through the light guide plate 70 passes through positions in the light guide plate 70 with a spread angle that is less than a predetermined value at each of the positions. More specifically, the light guided through the light guide plate 70 forms a spread angle that is less than a predetermined value about a direction connecting a position in the light guide plate 70 and the light source 20. That is, a light beam passing through a position in the light guide plate 70 forms a spread angle in the xy plane with the spread angle less than a predetermined value about a direction connecting the position in the light guide plate 70 and the light source 20. In this description the spread of a light beam passing through a point inside or outside the light guide plate is considered the spread of light when said light beam radiates from that point.

A plurality of deflectors 30 is provided on the rear surface 72 of the light guide plate 70; the plurality of deflectors 30 includes a deflector 30a, a deflector 30b, a deflector 30c, and a deflector 30d. The deflectors 30 are formed sequentially, for the most part, along the x axis direction. Light entering the first edge 73 from the light source 20 is totally reflected between the emission surface 71 and the rear surface 72 while guided by the light guide plate 70, and enters the deflectors 30 at each position of a deflector 30 along the x axis direction.

Here, the light guided by the light guide plate 70 is described as if there were no component spreading along the yz plane. The deflectors 30 cause the light entering at each position of a deflector 30, to substantially converge at a fixed point corresponding to the deflector 30. FIG. 1 specifically illustrates a portion of the deflectors 30: deflector 30a, deflector 30b, deflector 30c, and deflector 30d. FIG. 1 shows the light rays emitted from the deflector 30a, deflector 30b, deflector 30c, and deflector 30d converging.

More specifically, the deflector 30a corresponds to a fixed point PA in the image 6. The light rays from positions of the deflector 30a converge at the fixed point PA. Therefore, the optical wavefront from the deflector 30a appears as an optical wave front radiating from the fixed point PA. Similarly, the deflector 30b corresponds to the fixed point PB in the image 6, and light rays from positions of the deflector 30b converge at the fixed point PB. The deflector 30c further corresponds to the fixed point PC in the image 6, and light rays from positions of the deflector 30c converge at the fixed point PC. The deflector 30d further corresponds to the fixed point PD in the image 6, and light rays from positions of the deflector 30c converge at the fixed point PD. Thus, the deflectors 30 cause the light entering at each position of a deflector 30 to substantially converge at a fixed point corresponding to the deflector 30. Thus, any of the deflectors 30 may present an optical wavefront that appears as light radiating from a corresponding fixed point. The fixed points correspond to mutually different deflectors 30; and a grouping of a plurality of fixed points corresponding to the deflectors 30 produces an image 6 that may be perceived in a space.

Figure 2:
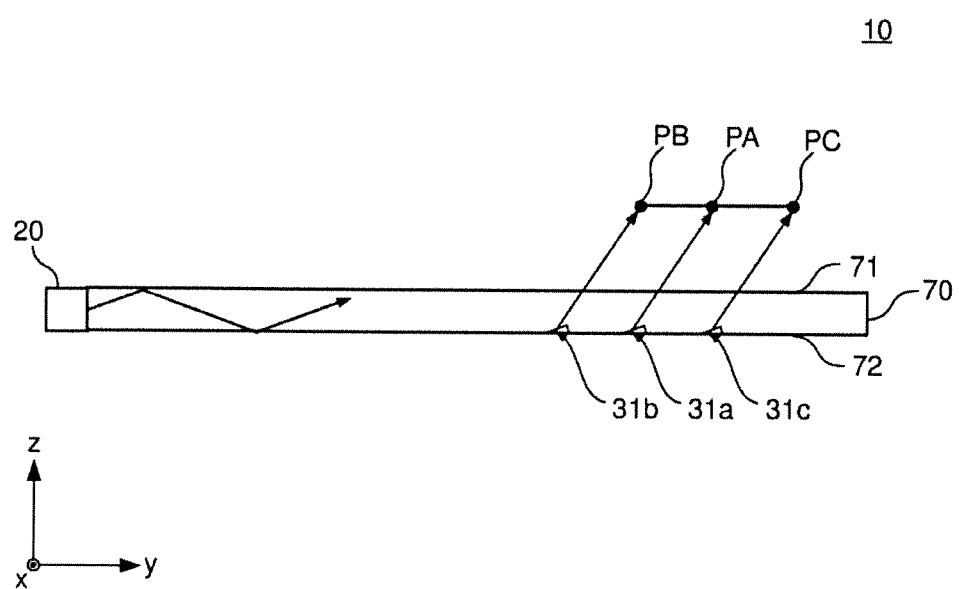
FIG. 2 illustrates a reflection surface 31a included in a deflector 30a; a reflection surface 31b included in deflector 30b; and a reflection surface 31c included in a deflector 30c.

In this embodiment, the deflectors 30 include multiple reflection surfaces formed sequentially, for the most part, along the x axis direction. A reflection surface is an example of a deflection surface. FIG. 2 illustrates one of the plurality of reflection surfaces included in the deflector 30a, i.e., a reflection surface 31a; one of the plurality of reflection surfaces included in the deflector 30b, i.e., a reflection surface 31b; and one of the plurality of reflection surfaces included in the deflector 30c, i.e., a reflection surface 31c. The light guided through the light guide plate 70 and incident on the reflection surface 31a reflects from the reflection surface 31a, passes through the emission surface 71, and travels toward PA. The light guided through the light guide plate 70 and incident on the reflection surface 31b reflects from the reflection surface 31b, passes through the emission surface 71, and travels toward PB. The light guided through the light guide plate 70 and incident on the reflection surface 31c reflects from the reflection surface 31c, passes through the emission surface 71, and travels toward PC.

The reflection surfaces of a single deflector 30 are oriented in mutually different directions and reflect light incident on the deflector 30 towards a single fixed point corresponding thereto. Thus, the light reflected from the reflection surfaces of the deflector 30 converges on a single fixed point corresponding to the deflector 30. For instance, the plurality of reflection light rays each from the plurality of reflection surfaces in the deflector 30a converge at the fixed point PA. The plurality of reflection light rays each from the plurality of reflection surfaces in the deflector 30b also converge at the fixed point PB. The plurality of reflection light rays each from the plurality of reflection surfaces in the deflector 30c further converge at the fixed point PC. The plurality of reflection light rays each from the plurality of reflection surfaces in the deflector 30d further converge at the fixed point PD.

Thus, as above described, the light guided through the light guide plate 70 forms a spread angle in the xy plane that is less than a predetermined value about a direction connecting the position in the light guide plate 70 and the light source 20. In other words, the light guided through the light guide plate 70 spreads in the xy plane about a direction connecting the position in the light guide plate 70 and the light source 20. A deflector 30 may be provided at a position distant from the light source 20; in this case, the light guided through the light guide plate 70 travels with roughly the y axis direction as the center from the position of the deflector 30, and spreads substantially in the xy plane. Accordingly, light from the deflector 30a converges at substantially a single fixed point in, for example, a plane parallel to the xz plane which includes the fixed point PA.

As illustrated in FIG. 1, the deflector 30a is formed along a line 190a; the deflector 30b is formed along a line 190b; and the deflector 30c is formed along a line 190c. Here, the line 190a, the line 190b, and the line 190c are straight lines substantially parallel to the x axis. Any other deflector 30 is similarly formed sequentially for the most part along straight lines substantially parallel to the x-axis.

In this manner, the deflectors 30 are each formed along a predetermined line within a plane parallel to the emission surface 71. Light guided by the light guide plate 70 is incident on the deflectors 30, and the deflectors 30 may cause emission light to exit from the emission surface 71 toward a direction substantially converging onto a single convergence point in a space. Note that the fixed point for producing an image may be provided near the rear surface 72 of the light guide plate 70. In this case, a deflector 30 corresponding to the fix point near the rear surface 72 may cause light to exit from the emission surface 71 in a direction where the light radiates from the fixed point. For example, a deflector 30 corresponding to a fixed point near the rear surface 72 may include a reflection surface that causes emission light to exit from the emission surface 71 toward a direction that causes the light to radiate substantially from a single convergence point in a space.

Note that the light guided by the light guide plate 70 might not include a component that spreads in a direction coinciding with the yz plane; in this case, light from the deflector 30 converges substantially at a fixed point as above described. In contrast, when the light guided by the light guide plate 70 includes a component that spreads in a direction coinciding with the yz plane, the light reflected by the reflection surface of the deflector 30 substantially converges on a convergence line parallel to the yz plane and parallel to the emission surface. For instance, the light from a deflector 30a substantially converges on a line that includes[the fixed point] PA parallel to the yz plane and parallel to the emission surface 71. The reflection surface on the deflector 30 creates emission light that exits from the emission surface 71 in a direction so that the light radiates, for the most part, from a single convergence line in a space, similarly to when the fixed point is near the rear surface 72 of the light guide plate 70. However, the observer can see only the portion of the light converging on or radiating from the convergence line that is traveling toward an observer's eye; this therefore allows the observer to perceive the image 6.

Figure 3:
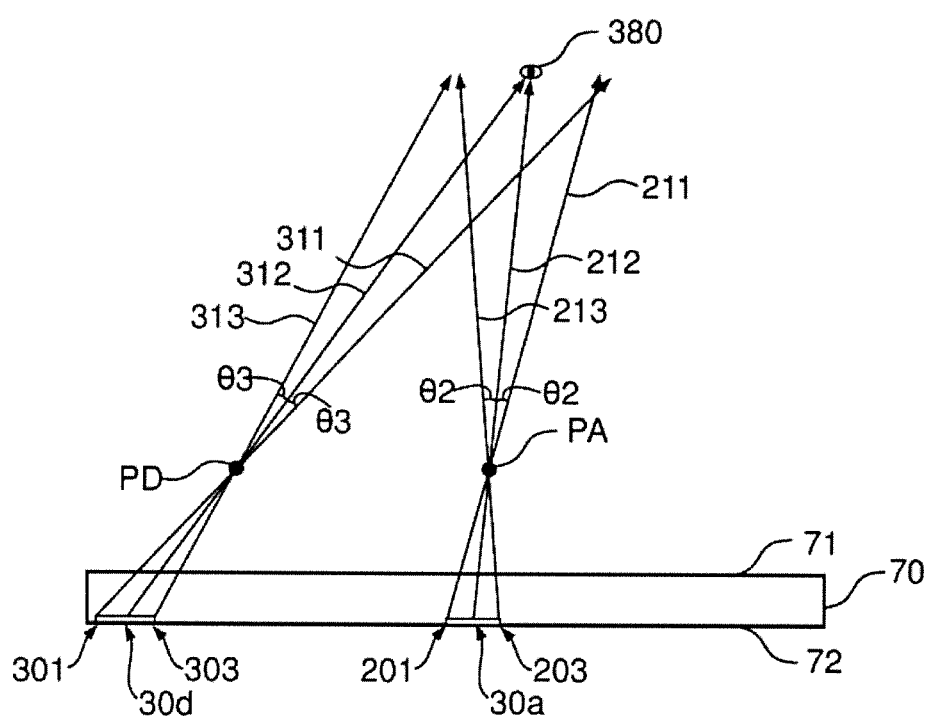
FIG. 3 schematically illustrates a cross-section of the display device 10 in the xz plane.
Figure 3:
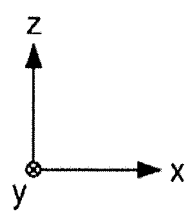

FIG. 3 schematically illustrates a cross-section of the display device 10 in the xz plane; the range through which the deflector 30a and the deflector 30d are each formed is described with reference to FIG. 3. Here, the range through which the deflector 30 is formed refers to the maximum range the reflection surface 31 is formed in the x axis direction. For example, in FIG. 3, the plurality of reflection surfaces on the deflector 30a is provided between a first edge 201 and a second edge 203 of the deflector 30a. Note that FIG. 3 depicts the light rays emitted from the deflector 30 and an observation position 380. FIG. 3 depicts a projection of the light rays and the observation position 380 on the xy plane.

FIG. 3 depicts a straight line 212 that passes through the fixed point PA and the observation position 380; FIG. 3 also depicts a straight line 211 that passes through the fixed point PA and the first edge 201 of the deflector 30a; the line 211 and the line 212 from an angle θ2. FIG. 3 also depicts a straight line 213 that passes through the fixed point PA and a second edge 203 of the deflector 30a; the line 213 and the line 212 from an angle θ2.

Accordingly, the reflection surfaces 31 on the deflector 30a are established such that a line connecting a reflection surface 31 and the fixed point PA forms an angle with the line 212 that is no greater than the angle θ2. Therefore, light from the fixed point PA passes through a specific range with the observation position 380 as the center. Note that the angle θ2 is a predetermined angle. The angle θ2 is defined by design; the angle θ2 may also be an upper limit defined by the design.

Thus, the deflector 30a is configured to cause light to exit from the emission surface 71 such that any of the light rays in the light exiting from the emission surface 71 via the deflector 30a pass through a specific observation position 380 in a space outside the light guide plate 70. The deflector 30a is configured such that the light rays in light emitted thereby pass through a specific range containing the observation position 380.

FIG. 3 shows L312 which is a straight line that passes through the fixed point PD and the observation position 380; L311 is a straight line that passes through the fixed point PD and a first edge 301 of the deflector 30d; L311 and L312 form an angle θ3. L313 is a straight line that passes through the fixed point PD and a second edge 301 of the deflector 30d; L313 and L312 form an angle θ3.

Accordingly, the reflection surfaces 31 on the deflector 30d are established such that a line connecting a reflection surface 31 and the fixed point PD forms an angle with L312 that is no greater than the angle θ3. Therefore, light from the fixed point PD passes through a specific range with the observation position 380 as the center. Note that the angle θ3 is a predetermined angle. The angle θ3 is defined by design; the angle θ3 may also be an upper limit defined by the design.

Thus, the deflector 30d is configured to cause light to exit from the emission surface 71 such that any of the light rays in the light exiting from the emission surface 71 via the deflector 30d pass through a specific observation position 380 in a space outside the light guide plate 70. The deflector 30d is configured such that the light rays in the light emitted thereby pass through a predetermined range containing the observation position 380.

The other deflectors 30 in the light guide plate 70 are configured identically to the deflector 30a and the deflector 30d. That is, each deflector 30 is configured to cause light to exit from the emission surface 71 such that any of the light beams in the light exiting from the emission surface 71 via the deflector pass through a specific observation position 380 in a space outside the light guide plate 70. Each of the deflectors 30 is configured such that the light rays in light emitted thereby pass through a predetermined range containing the observation position 380. Thus, an observer can view the entire image 6, without any of portion of the image 6 appearing missing when the observer's eye is in a specific range that contains the observation position 380.

Note that the observation position 380 may be established at a location predicted to be the center between both of the observer's eyes when the observer uses the display device 10. The observation position 380 may also be established on a line parallel to the xy plane at a location predicted to be the center between both of the observer's eyes when the observer uses the display device 10. For instance, the position of both eyes of the player of a game machine is generally defined when the display device 10 is used in a game machine. Configuring the deflectors 30 in accordance with the position of an observer's eye as above described is particularly advantageous when the observation position of the observer can be predicted.

The distance from the emission surface 71 to the observation position 380 may be roughly 50 cm. The distance from the emission surface 71 to the observation position 380 may be from roughly 30 cm to 1 m. Thus, the deflectors 30 are preferably configured in accordance with the position of the observer's eyes, as above described, when it is predicted that the observer's eyes will be relatively close to the emission surface 71. A constant emission direction for all the deflectors 30 increases the likelihood that some light will not reach the observer's eyes when the observer's eyes are relatively close to the emission surface 71.

Figure 4:
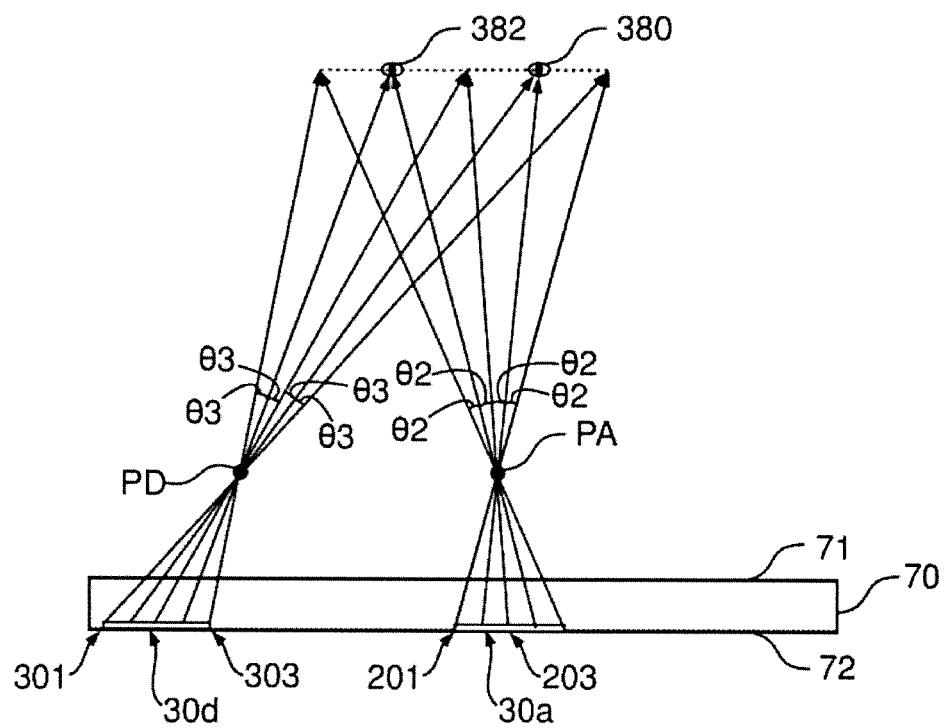
FIG. 4 illustrates a cross-section of the display device 10 in the xz plane when an additional observation position 382 is defined.

FIG. 4 illustrates a cross-section of the display device 10 in the xz plane when an additional observation position 382 is defined. As illustrated in FIG. 4, the edge 203 of the deflector 30a is positioned such that a straight line passing through the fixed point PA and the edge 203 forms an angle θ2 with a straight line passing through the fixed point PA and the observation position 382. The edge 303 of the deflector 30d is positioned such that a straight line passing through the fixed point PD and the edge 303 forms an angle θ3 with a straight line passing through the fixed point PD and the observation position 382.

Thus, the deflectors 30 in the light guide plate 70 are configured to cause light to exit from the emission surface 71 such that any of the light rays in the light exiting from the emission surface 71 via the deflectors 30 pass through a specific observation position 380 and observation position 382 in a space outside the light guide plate 70. Each of the deflectors 30 is configured such that the light rays in light emitted thereby pass through a specific range containing observation position 380 and observation position 382. Thus, an observer can view the entire image 6, without any of portion of the image 6 appearing missing when the observer's eye is in the aforementioned specific range.

As described with reference to FIG. 3 and FIG. 4, the deflectors 30 are configured such that light from the deflectors 30 passed through a specific range that contains a specific observation position. It is thus possible to limit the range created by the deflectors 30. Therefore, it is possible to reduce the surface area on the light guide plate 70 filled with the deflectors 30. Consequently, it is possible to reduce the cost of manufacturing the display device 10. For instance, the machining costs incurred when machining the rear surface 72 to form the deflectors 30 may be reduced. The ability of the light guide plate to transmit light also increases since less of the surface area on the light guide plate may be filled with the deflectors 30.

Note that a single observation position 380 was described with reference to FIG. 3; further, two observation positions: observation position 380 and observation position 382 were described with reference to FIG. 4; however, the number of observation positions is not limited to one or two. There may be three or more observation positions.

Figure 5:
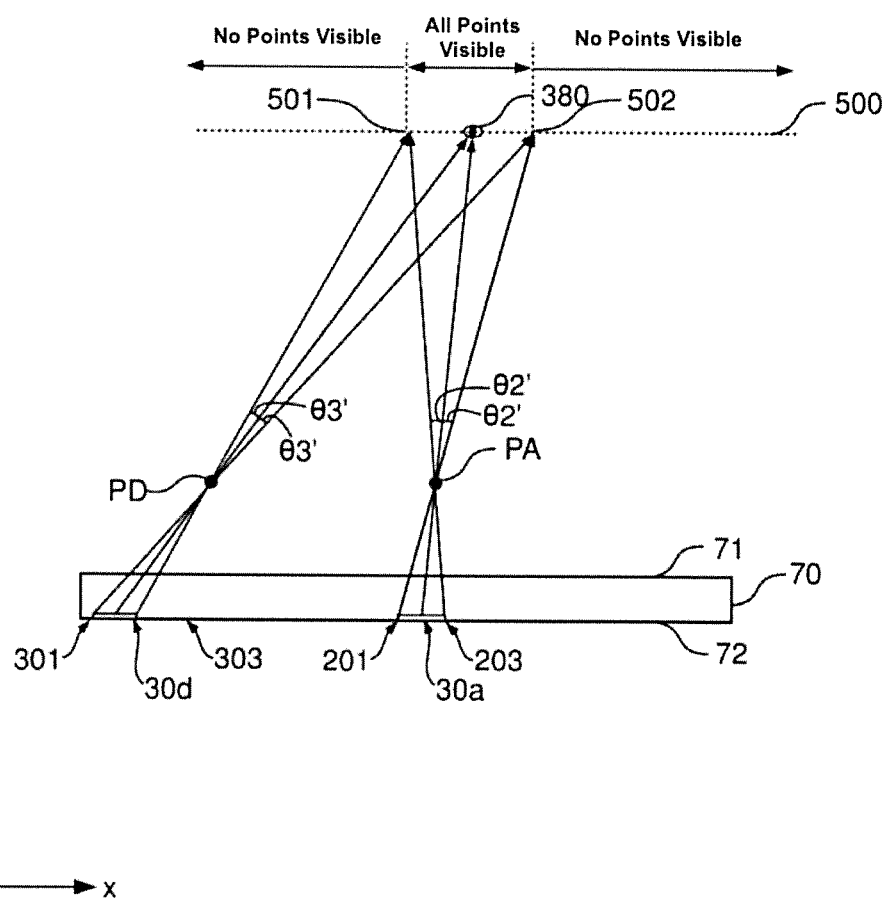
FIG. 5 illustrates a cross-section of the display device 10 in the xz plane when observation position is limited to a specific range wherein an image can be perceived.

FIG. 5 illustrates a cross-section of the display device 10 in the xz plane when the observation position is limited to a specific range wherein an image can be perceived. The line 500 passes through the observation position 380 and is parallel to the xy plane. The point 501 on the line 500 is located away from the observation position 380 in the negative x-axis direction at exactly a predetermined distance. The point 502 on the line 500 is located away from the observation position 380 in the positive x-axis direction at exactly a predetermined distance. Here, the image can only be perceived at an observation position along the line 500. That is, an observer's eyes are assumed to exist along the line 500.

The edge 201 of the deflector 30a is located where the extension of a line connecting the point 502 and the fixed point PA intersect with the light guide plate 70. The edge 203 of the deflector 30a is located where the extension of a line connecting the point 501 and the fixed point PA intersect with the light guide plate 70. The edge 303 of the deflector 30d is located where the extension of a line connecting the point 501 and the fixed point PD intersect with the light guide plate 70. The edge 301 of the deflector 30d is located where the extension of a line connecting the point 502 and the fixed point PD intersect with the light guide plate 70.

Therefore, an observer can see both the fixed point PA and the fixed point PD when the observer's eyes are on the line segment between point 501 and point 502. In contrast, an observer can see neither the fixed point PA nor the fixed point PD when the observer's eyes are on an extension of the line segment between point 501 and point 502.

The other deflectors 30 in the light guide plate 70 are similar to the deflector 30a and the deflector 30d in that, one edge of a deflector 30 is located along an extension line passing through the point 501 and the other end of the deflector 30 is located along an extension line passing through the point 502. Thus, an observer can view the entire image 6, without any of portion of the image 6 appearing missing when the observer's eye is on a line segment between point 501 and point 502. In contrast, an observer can see absolutely none of the image 6 when the observer's eyes are on an extension of the line segment between point 501 and point 502. That is, the display device 10 in FIG. 5 allows an observer to see the image 6 only when the observer's eyes are on and line segment connecting the point 501 on the point 502. The observer cannot see any of the points in the image 6 when the observer's eyes are located outside said line segment. Thus, the position and range of the deflectors 30 may be defined to prevent an observer from only being able to see a portion of the image 6 when it is possible to predict that the observer's eyes will be located at a specific distance from the emission surface 71.

Figure 6:
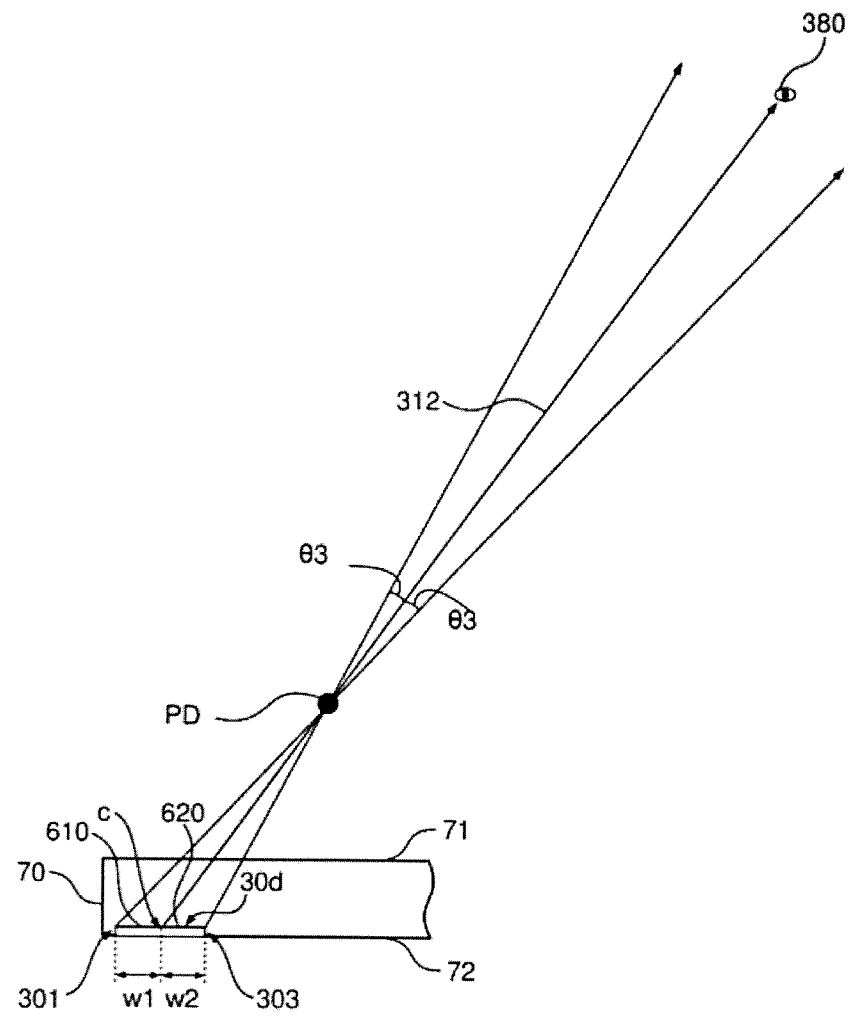
FIG. 6 is an exploded view of a portion of FIG. 3.

FIG. 6 is an exploded view of a portion of FIG. 3; here, the deflector 30d includes a first segment 610 and a second segment 620 bounded by an intersection point c between the line 312 and the rear surface 72. The first segment 610 is closer to the edge 301 from the intersection point c; the second segment 620 is closer to the edge 303 from the intersection point c; and the line 312 coincides with the optical axis of the light converging on the point PD.

The deflector 30 contains a first segment 610 near one edge and a second segment 620 near the other edge in the xz plane about a position corresponding to the line 312. Light emitted from the first segment 610 and light emitted from the second segment 620 are asymmetrical about the line 312. In addition, the length w1 of the first segment 610 in the x axis direction and the length w2 of the second segment 620 in the x axis direction are different in the xz plane. The first segment 610 and the second segment 620 can be considered to have asymmetrical lengths.

Thus, at least one of the deflectors 30 in the plurality of deflectors 30 includes a first segment near one edge and the second segment near the other edge thereof. The first segment and the second segment are situated about a position corresponding to the optical axis of light converging toward or radiating from a convergence point or convergence line in a plane orthogonal to the direction along which light is guided by the light guide plate. Light emitted from the first segment 610 and light emitted from the second segment 620 are asymmetrical about the optical axis. For example, the lengths of the first segment 610 and the second segment 620 in a direction parallel to the emission surface 71 differ in a plane orthogonal to the direction along which light is guided by the light guide plate.

The deflectors 30 may be designed with a specific observation position defined therefor; note that in this case, typically, a deflector 30 near at least one edge of the light guide plate 70 in the x-axis direction has greater degree of asymmetry than a deflector 30 near the center of the light guide plate 70.

Figure 7:
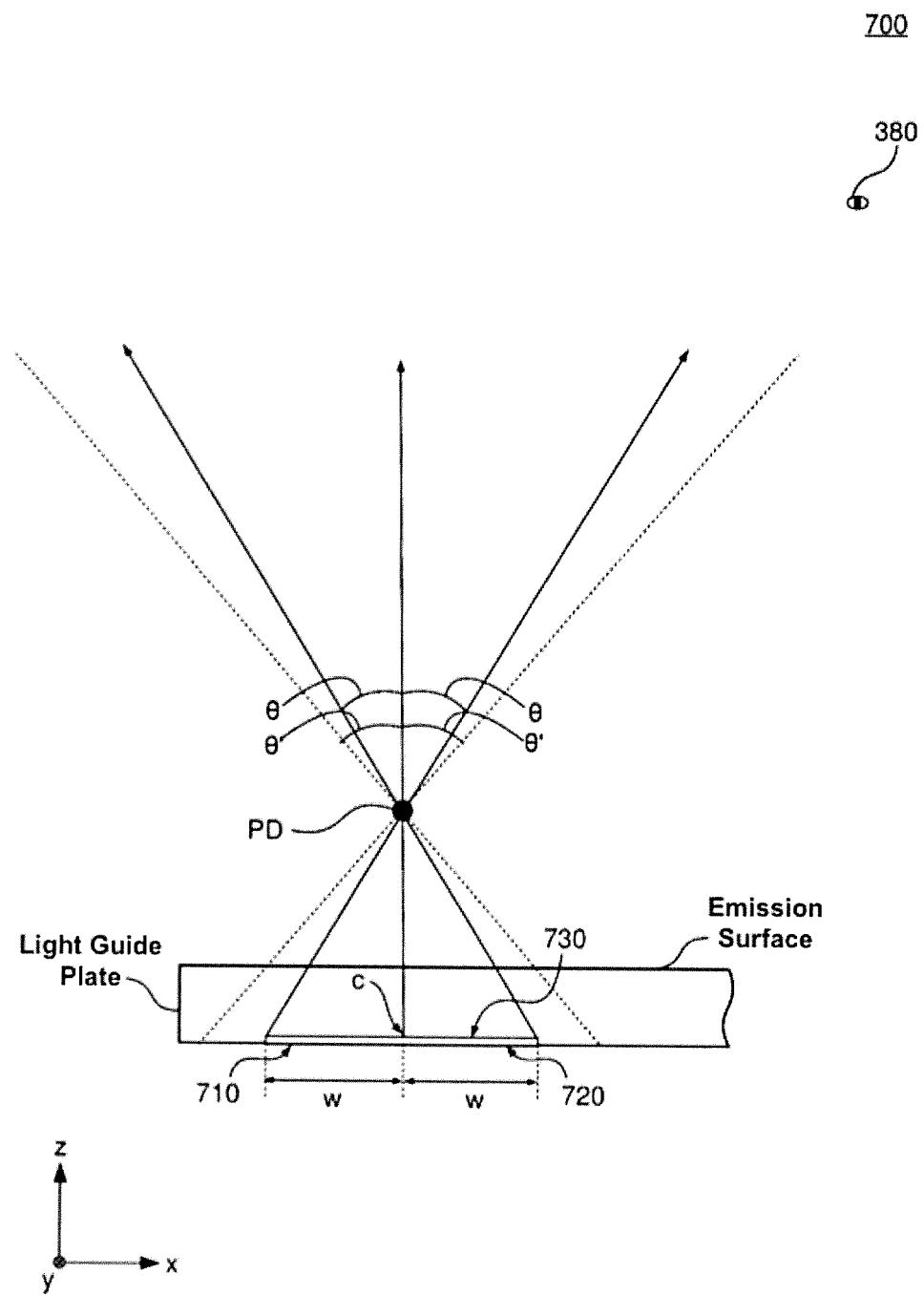
FIG. 7 depicts a display device 700 as a comparative example of the display device 10.

FIG. 7 depicts a display device 700 as a comparative example of the display device 10; FIG. 7 depicts a section corresponding to FIG. 6. The deflectors 730 in the display device 700 correspond to the deflectors 30d. A deflector 730 is configured so that the divergence angle of light radiating from the fixed point PD is an angle θ about the optical axis. The optical axis of the light emitted by a deflector 730 is orthogonal to the emission surface when projected on that xz plane. Similarly, the optical axis of the light emitted by each of the other deflectors is orthogonal to the emission surface when projected on that xz plane. The light emitted by the deflectors 730 is symmetrical about the optical axis. Hereby, the light emitted from the deflectors 30 illustrated in FIG. 6 and the light emitted from the deflectors 730 in FIG. 7 illustrating a comparative example have a different symmetry about the optical axis.

The light emitted from a segment 710 of the deflector 730 toward the negative x direction from the intersection point c is symmetrical to the light emitted from a segment 720 of the deflector 730 toward the positive x direction from the intersection point c. The lengths w of the segment 710 and the segment 720 are also the same. Thus, the deflectors 30 described with reference to FIG. 6, and the deflectors FIG. 7 illustrating the comparative example, are optically different structures.

Note that light from the deflectors 730 does not pass through the observation position 380. Therefore, an observer at the observation position 380 does not perceive the fixed point PD. Hereby, arranging the deflectors without considering the observation position may result in an image where a portion thereof is cannot be seen from the observation position. In order to ensure that an observer at the observation position 380 can see the entire image 6, the divergence angle of light radiating from the fixed point PD about the optical axis in the display device 700 must be expanded to θ' as illustrated by the dotted lines in FIG. 7. This increases the surface area forming the deflector. If the surface area of the deflector increases, the machining costs for producing the deflector also increases. Additionally, the light guide plate becomes less transmissive overall.

In contrast, the display device 10 described with reference to FIG. 1 through FIG. 6 is capable of reducing the machining costs of producing the deflectors 30 as above described. Additionally, the light guide plate 70 is more transmissive overall.

Figure 8:
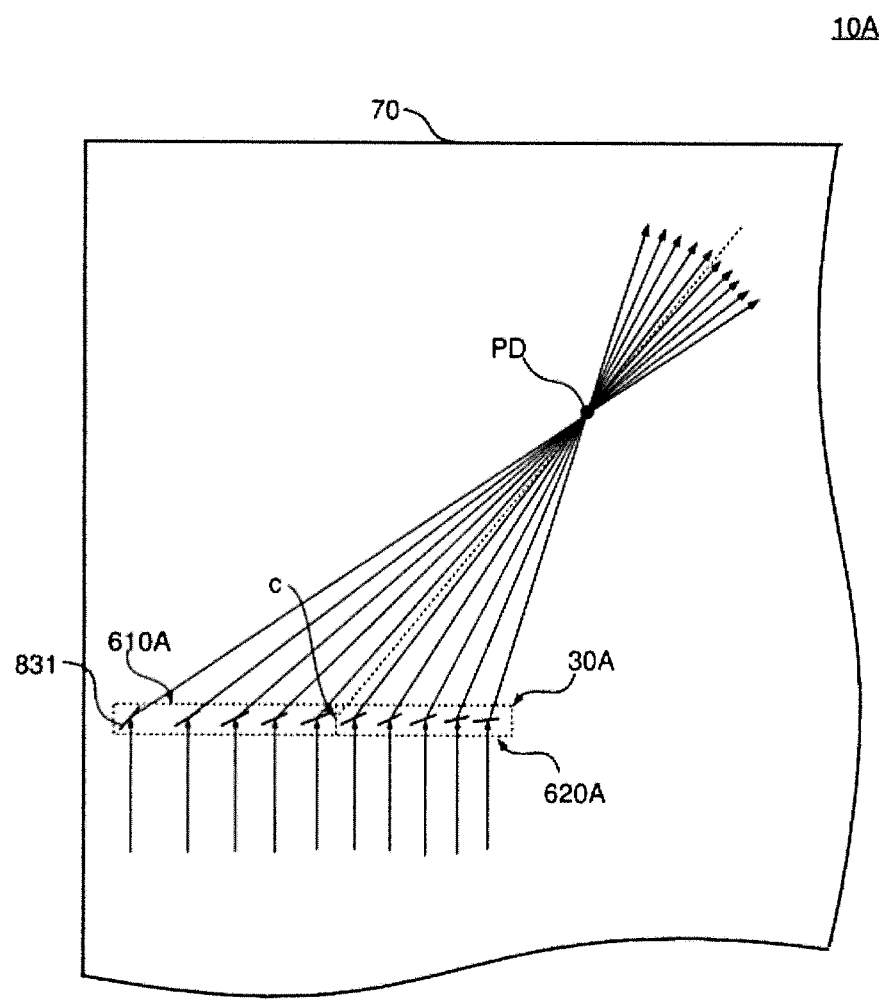
FIG. 8 illustrates a cross-section of a display device 10A as a comparative example of the display device 10.

FIG. 8 illustrates a cross-section of a display device 10A as a comparative example of the display device 10; FIG. 8 illustrates the fixed point PD and light rays projected on the xy plane. The deflectors 30A correspond to the deflectors 30d in the display device 10. The first segment 610A corresponds to the first segment 610 in the display device 10. The second segment 620A corresponds to the second segment 620 in the display device 10. The deflector 13A contains a plurality of reflection surfaces 31A corresponding to the reflection surfaces 31 and the display device 10.

The plurality of reflection surfaces 831 is depicted by lines in FIG. 8. The line representing a reflection surface 831 intersects a plane parallel to the xy plane. It is assumed that the light entering the light guide plate 70 in the display device 10A is substantially parallel light within the xy plane. That is, the light guide plate 70 guides substantially parallel light to the emission service 71 in the xy plane.

The plurality of reflection surfaces 31A are oriented asymmetrically about the center of the deflectors 30 in the display device 10A. The plurality of reflection surfaces 31A are also oriented asymmetrically relative to the intersection point c between the optical axis of light radiating from the fixed point PD and the light guide plate 70. Thus, the plurality of reflection surfaces in the first segment 610A and the plurality of reflection surfaces in the second segment 620A are oriented asymmetrically about a position corresponding to a line connecting a convergence point or a convergence line and an observation position even when the light guided by the light guide plate 70 is substantially parallel light.

Figure 9:
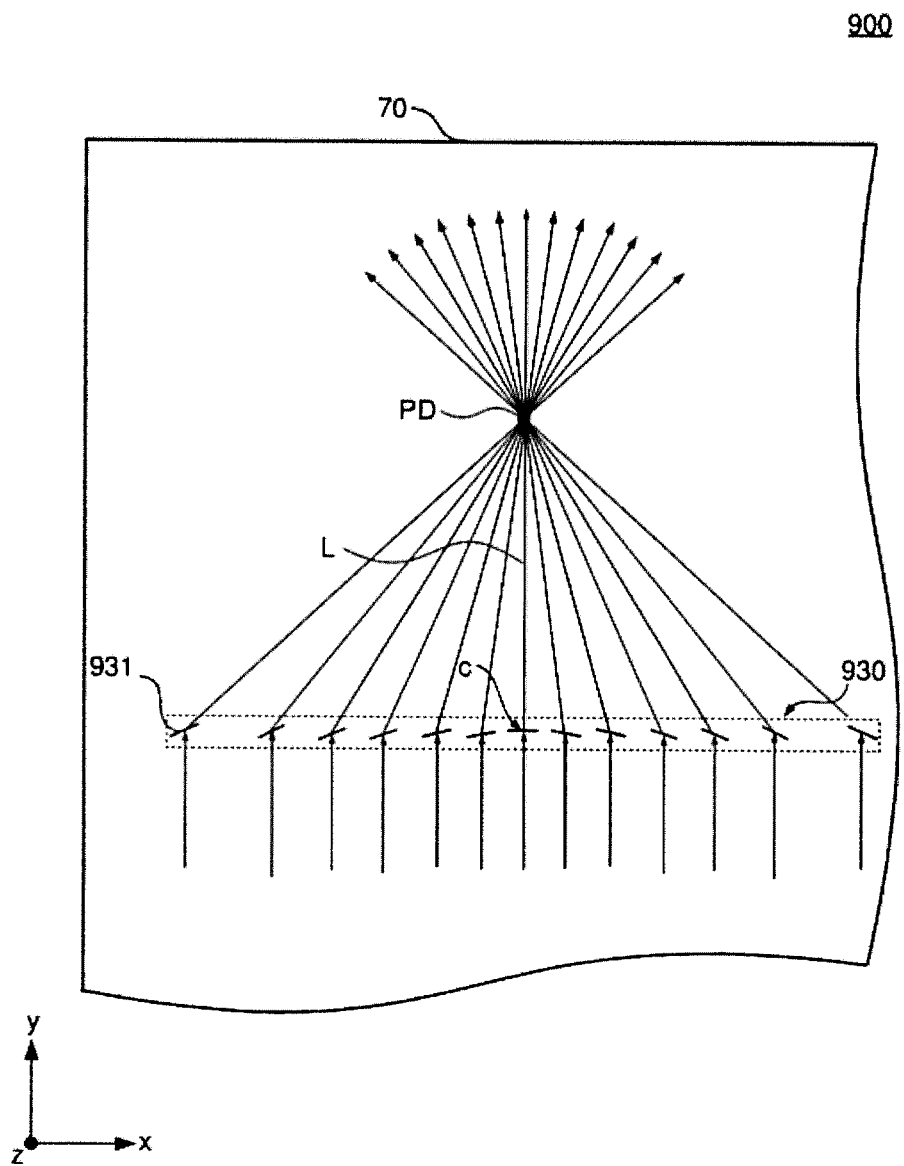
FIG. 9 depicts a display device 900 as a comparative example of the display device 10A.

FIG. 9 depicts a display device 900 as a comparative example of the display device 10A; FIG. 9 depicts a section corresponding to FIG. 8. The deflectors 930 in the display device 900 correspond to the deflectors 30d. The deflectors 930 correspond the deflectors 730 in FIG. 7. The light emitted from the deflectors 930 are assumed to have optical characteristics that are identical to the light emitted from the deflectors 730 and FIG. 7.

A deflector 930 includes a plurality of reflection surfaces 931. The plurality of reflection surfaces 931 is depicted by lines in FIG. 9. The line representing a reflection surface 931 intersects a plane parallel to the xy plane. The reflection surfaces 931 are oriented symmetrically relative to the intersection point c and the optical axis L of light emitted from the fixed point PD.

Hereby, the reflection surfaces 931 may be oriented symmetrically relative to the intersection point c when the deflectors 930 are designed without a defined observation position for substantially parallel light guided through the xy plane by the light guide plate 70. In contrast, as described with reference to FIG. 8, the reflection surfaces are oriented asymmetrically relative to the intersection point c when the deflectors 30 are designed with a defined observation position.

In that manner, the structure of the reflection surfaces on the deflectors 30A in FIG. 8 has a different symmetry than the structure of the reflections surfaces on the deflectors 930 in FIG. 9.

Figure 10:
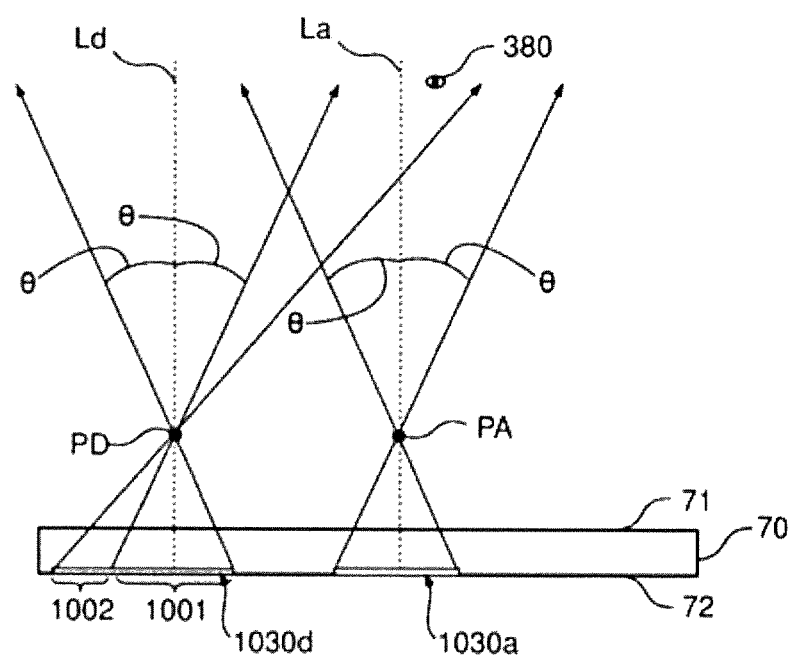
FIG. 10 illustrates a cross-section of a display device 10B as a comparative example of the display device 10.

FIG. 10 illustrates a cross-section of a display device 10B as a comparative example of the display device 10. FIG. 10 illustrates deflectors 1030a corresponding to the deflectors 30a and the deflectors 1030d corresponding to the deflectors 30d.

A deflector 1030a is configured so that the light radiating from the fixed point PA creates an angle θ about the optical axis La. The light emitted from the deflectors 1030a pass through a predetermined range containing the observation position 380. Therefore, the deflectors 1030a may be adopted in the display unit 10B as deflectors that provide light from the fixed point PA to the observation position 380.

The deflectors 1030d include a segment 1001 configured to cause light emitted therefrom to converge at the fixed point PD, and create an angle about the optical axis Ld. Note that light from the segment 1001 does not pass through the observation position 380.

In addition to the segment 1001, the deflectors 1030d also include a segment 1002 toward the negative x axis. The segment 1002 is positioned so that light from the segment 1002 passes through a predetermined range that contains the observation position 380. The deflectors 1030d contain no additional segments in the positive x axis direction relative to the segment 1001. Thus, establishing an observation position allows for deflectors to be provided at only the segments required to emit light that passes through the observation position; therefore, is possible to control significant increases in the surface area on the light guide plate 70 whereon the deflectors are formed.

Figure 11A:
FIGS. 11A and 11B are schematic views of a deflector 130 and a deflector 132 as comparative examples of the deflector 30.
Figure 11B:
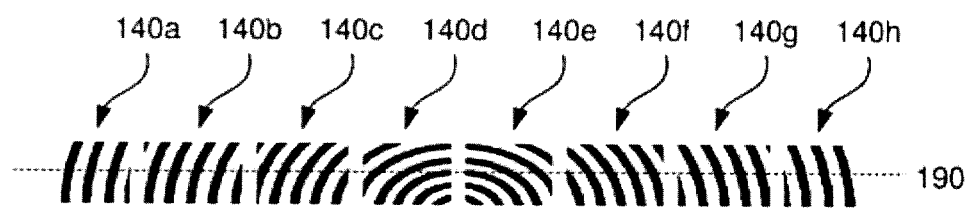

FIGS. 11A and 11B are schematic views of a deflector 130 and a deflector 132 as comparative examples of the deflector 30. FIG. 11A outlines a single deflector 130, formed from a portion of a Fresnel lens. The plurality of refraction surfaces (prism surfaces) in the deflector 130 may include gaps therebetween, where the plurality of refraction surfaces and the gaps function as a Fresnel lens.

The deflectors 132 illustrated in FIG. 11B corresponds to a deflector 130 partitioned into a plurality of segments along the x axis direction, i.e., a segment 140a, segment 140b, segment 140c, segment 140d, segment 140e, segment 140f, segment 140g, and segment 140h. Light from each of the segments in the deflector 132 converge on or radiate from the same fixed point. Thus, partitioning the deflector into a plurality of segments may increase the contrast of the image. Note that in addition to a reflection surface or a Fresnel lens, a diffraction grating may also be used as a deflector 30.

Figure 12:
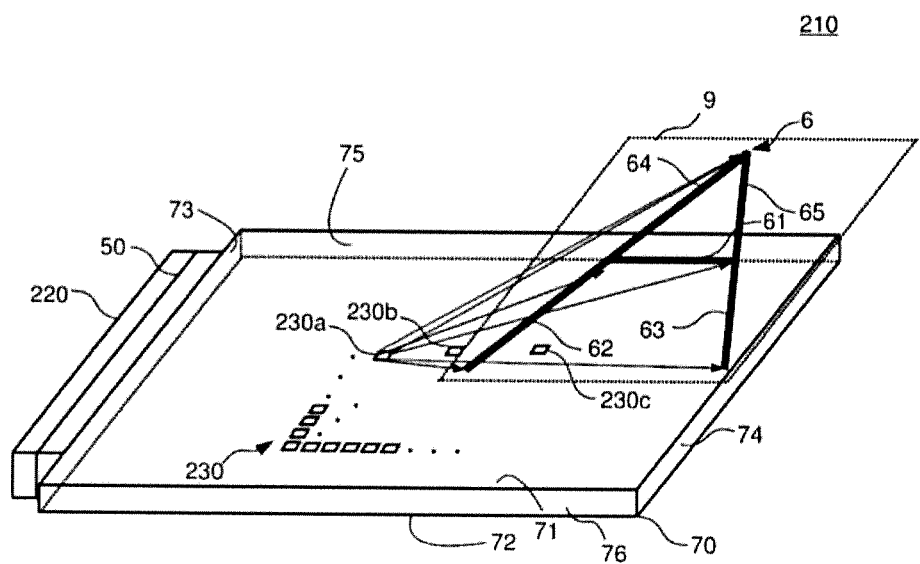
FIG. 12 is a schematic view of a display device 210 according to a second embodiment along with an image projected onto a space.

FIG. 12 is a schematic view of a display device 210 according to a second embodiment along with an image projected into a space. The components in the display device 210 with reference numerals identical to components in the display device 10 have an identical configuration. In describing the second embodiment, descriptions of the configurations identical to those in the display device 10 are omitted, with differences primarily described.

In one or more embodiments, the image 6 is an image of the character "A" in a plane 9 located on the positive side of the z axis from the emission surface 71. The plane 9 is parallel to the xy plane. The display device 210 is provided with a light guide plate 70, a light source 220, and a light-incidence tuning portion 50.

The light source 220 may include a light emitting diode (LED). Light from the light source 220 is adjusted by the light-incidence tuning portion 50 and enters the light guide plate 70 via the first edge 73 as incidence light.

A plurality of deflectors 230 is provided on the rear surface 72 of the light guide plate 70; the plurality of deflectors 230 includes a deflector 230a, a deflector 230b, and a deflector 230c. The deflectors 230 may be provided two-dimensionally within the xy plane. The deflectors 230 may be provided in a matrix in the xy plane. Light guided by the light guide plate 70 enters the deflectors 230.

The deflector 230a, the deflector 230b, and the deflector 230c each deflect light propagating through the light guide plate 70 and each causes the light exiting from the emission surface 71 to draw the image 6. More specifically, the deflector 230a causes the emission surface 71 to emit light bound for various locations in the image 6. The deflector 230a deflects the light guided thereto by the light guide plate 70 such that the light spreads out in the xy plane and the yz plane and travels toward various locations in the image 6. FIG. 12 illustrates a state where light from the deflector 230a spreads out toward a number of locations in the image 6. The deflector 230b and the deflector 230c along with the other deflectors 230 each behave identically. The deflectors 230 fill a microscopic area on the rear surface 72. Each of the deflectors 230 fill a smaller surface area than when projected on the image 6 in the xy plane. The image 6 is created from light spreading out from each deflector 230 among the multitude of deflectors 230 toward various locations in the image 6. That is, the light from a multitude of deflectors 230 produces the light that radiates from the direction of the image 6. The light that creates the image 6 may be provided by at least three deflectors 230 that are not along the same straight line. That is, each of the deflectors 230 converts light entering therein into light with an intensity distribution according to the image 6 that spreads out two-dimensionally and exits from the emission surface. Thus, the light from the three or more deflectors 230 that are not on the same straight line forms the image 6. The display device 210 is thereby able to project a three-dimensional image into a space. The display device 210 groups the light beams from the plurality of deflectors 230 that are not on the same straight line to provide an observer with light beams that radiate from the image 6. An observer is therefore able to perceive the image 6 regardless of whether the image is viewed from the x axis direction or the y axis direction.

Figure 13:
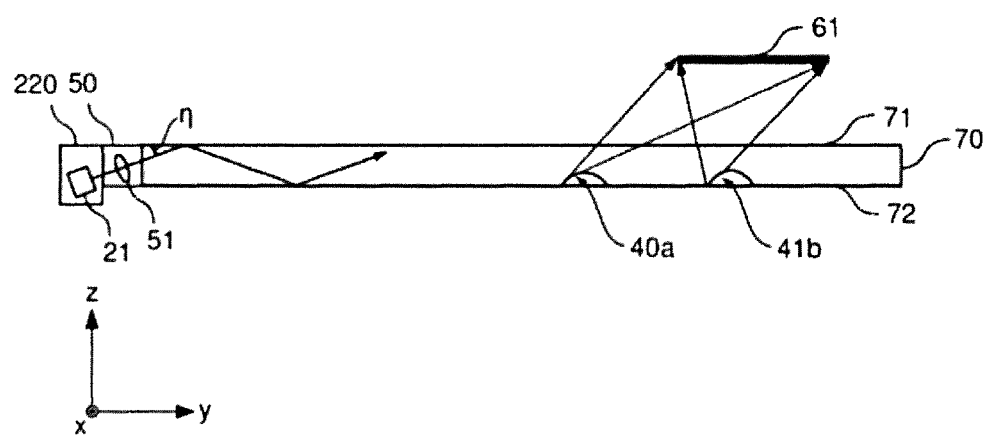
FIG. 13 schematically illustrates a cross section of the display device 210 in the yz plane.
Figure 14:
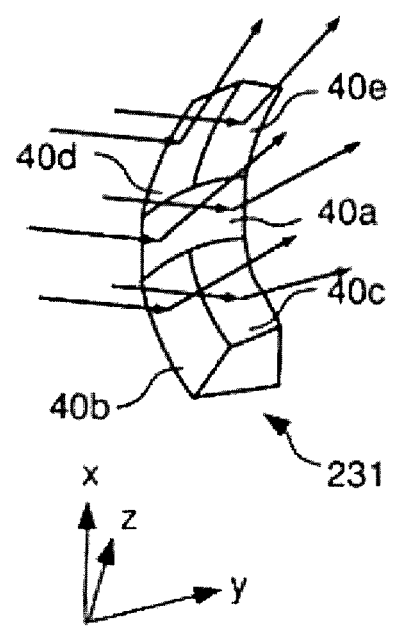
FIG. 14 is a schematic view illustrating an example of an optical element 231 that includes a deflector 230.

FIG. 13 schematically illustrates a cross section of the display device 210 in the yz plane; and FIG. 14 is a schematic view illustrating an example of an optical element 231 that includes a deflector 230.

The light source 220 may include an LED 21. A plurality of the LEDs 21 is arranged along the x axis direction. The optical axis of the light emitted from the LEDs 21 form an angle η with the emission surface 71. The narrow angle η between the optical axis of the light emitted from the LEDs 21 and the emission surface 71 is less than 20°. The light emitted from the LEDs 21 enters the light-incidence tuning portion 50.

The light-incidence tuning portion 50 includes lenses 51. The lenses 51 arranged along the x axis direction are respectively paired to an LED 21 in the plurality of LEDs 21. Each of the lenses 51 reduces the spread of light traveling along the optical axis for the light emitted from the LED 21 corresponding thereto. The lenses 51 render light emitted from the LEDs 21 as nearly parallel light. For instance, the lenses 51 may reduce the spread angle of the light emitted from the LEDs 21 in the xy plane. The lenses 51 may also reduce the spread angle of the light emitted from the LEDs 21 in the yz plane. Hereby, light may enter the light guide plate 70 as nearly parallel light.

Hereby the light beams within the xy plane guided by the light guide plate 70 and passing through locations in the light guide plate 70 spread out at an angle of a predetermined value and advance from the locations in the light guide plate 70 about a direction connecting the locations in the light guide plate 70 and the light source 220. In this disclosure, the light that spreads from a certain point when light beams pass through the certain point inside or outside the light guide plate and advances is considered to have been output from that point, and is simply referred to as "the spread of light" or the like. The angle of this spread of light is referred to simply as the "spread angle". In a light intensity distribution along an angular direction, the spread angle may be the position at which the light intensity is half the maximum (full width at half maximum). The spread angle of light guided by the light guide plate 70 may be less than or equal to 5°. The spread angle of light may ideally be less than 1°. When projected onto the xy plane, the spread angle of the light may be less than or equal to 5° and ideally may be less than 1°. When projected onto the yz plane, the spread angle of the light may be less than or equal to 5° and ideally may be less than 1°.

As illustrated in FIG. 13 and FIG. 14, the deflector 230a includes a reflection surface 40a. The deflector 230a also includes reflection surface 40b, reflection surface 40c, reflection surface 40d, and reflection surface 40e. The reflection surface 40 is an example of an optical surface functioning as a deflection surface that deflects light. The reflection surface 40a, reflection surface 40b, reflection surface 40c, reflection surface 40d, and reflection surface 40e are curved surfaces oriented in different directions. As above described, the optical axis of the LEDs 21 is inclined at an angle η in the yz plane relative to the emission surface 71. Therefore, even when the light entering the light guide plate 70 approaches parallel light, a greater amount of light is repeatedly reflected by and propagated between the emission surface 71 and the rear surface 72 in the light guide plate 70 compared to when the optical axis of incident light that is parallel to the y axis. Consequently, a greater amount of light strikes the reflection surface 40 compared to when the optical axis of incident light is parallel to the y axis.

The reflection surface 40a causes light incident thereon to be emitted from the emission surface 71 at a different emission angle according to where the light is incident on the reflection surface 40a. The reflection surface 40a causes light incident thereon to spread within an area 61 in the image 6. In one or more embodiments, the area 61 is an area parallel to the y axis. The light reflecting from the reflection surface 40a is oriented from the reflection surface 40a toward where the area 61 exists, and essentially no light reflected from the reflection surface 40a travels toward where the area 61 does not exist. Accordingly, the light reflected from the reflection surface 40a is substantially distributed only at angles within the yz plane from the reflection surface 40a toward the area 61. Thus, the reflection surface 40a modulates the intensity of incident light in the yz plane in an angular direction and outputs said light. The reflection surface 40a is a curved surface; therefore, the reflection surface 40a is still capable of producing light that forms lines that create the image even when the light incident thereon is parallel light.

The reflection surface 40b reflects the light incident thereon spreading the light within an area 62 in the image 6. The area 62 forms a portion of the character 'A' between an intersection point with the area 61 on the negative y axis and the furthest end point along the positive x axis. The reflection surface 40c reflects the light incident thereon spreading the light within an area 63 in the image 6. The area 63 forms a portion of the character 'A' between an intersection point with the area 61 on the positive y axis and the furthest end point along the positive x axis. The reflection surface 40d reflects the light incident thereon spreading the light within an area 64 in the image 6. The area 64 forms a portion of the character 'A' between an intersection point with the area 61 on the negative y axis and the furthest end point along the negative x axis. The reflection surface 40e reflects the light incident thereon spreading the light within an area 65 in the image 6. The area 65 forms a portion of the character 'A' between an intersection point with the area 61 on the positive y axis and the furthest end point along the negative x axis. Because the reflection surface 40b, the reflection surface 40c, the reflection surface 40d, and the reflection surface 40e are all curved, each of the reflection surfaces 40 is capable of producing light that forms lines that create the image even when the light incident thereon is parallel light.

Thus, the reflection surface 40a spreads light incident thereon having an intensity distribution according to at least the image of the area 61 along the z axis, and causes emission of said light. The reflection surface 40b spreads light incident thereon having an intensity distribution according to at least the image of the area 62 along the x axis, and causes emission of said light. The reflection surface 40c spreads light incident thereon having an intensity distribution according to at least the image of the area 63 along the x axis, and causes emission of said light. The reflection surface 40d spreads light incident thereon having an intensity distribution according to at least the image of the area 64 along the x axis, and causes emission of said light. The reflection surface 40e spreads light incident thereon having an intensity distribution according to at least the image of the area 64 along the x axis, and causes emission of said light. Thus, the deflector 230a possesses a plurality of reflection surfaces that reflect light towards lines in the image 6 where the deflector 230a modulates the intensity of incident light two-dimensionally or in two directions according to the image 6, and causes emission of said light from the emission surface 71. Hereby, a single deflector 230a provides light beams that pass through substantially all the image 6.

The deflector 230b includes a reflection surface 41b. Similar to the reflection surface 40a, the reflection surface 41b causes light incident thereon to be emitted from the emission surface 71 at a different emission angle according to where the light is incident on the reflection surface 41b. More specifically, the light reflecting from the reflection surface 41b spreads within an area 61 in the image 6. FIG. 14 only illustrates the reflection surface 40a and the reflection surface 41b; however, each of the deflectors 230 include a reflection surface that spreads the incident light within the area 61. Each of the deflectors 230 includes a plurality of reflection surfaces that reflect light toward lines within the image 6 similarly to the deflector 230a. Each of the deflectors 230 modulates the intensity of the light incident thereon two-dimensionally or in two directions according to the image 6, and causes emission of said light from the emission surface 71. Thus, each of the deflectors 230 provides light beams that pass through substantially all the image 6.

The light emitted from the emission surface 71 is actually refracted within the emission surface 71. Therefore, the deflectors 230 are designed to consider the refraction within the emission surface 7L However, for the sake of simplicity, one or more embodiments is described as if there were no refraction in the emission surface 71.

Figure 15:
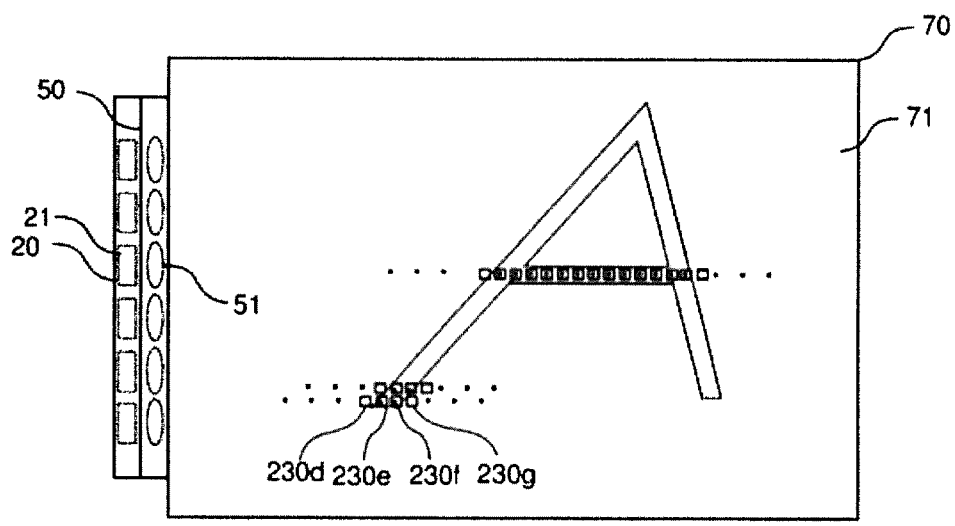
FIG. 15 schematically illustrates a deflector 230 providing light that travels toward a specific observation position.

FIG. 15 schematically illustrates a deflector 230 providing light that travels toward a specific observation position. For instance, the light that produces the area 62 is provided from a specific reflection surface in the deflector 230e, and a specific reflection surface in the deflector 230f, while no light is provided from the deflector 230d and the deflector 230g. Thus, a specific portion in the image 6 is created by specific portions of a specific deflector 230 among the plurality of deflectors 230 when the image is viewed from a specific observation position.

The display device 210 is configured such that each of the plurality of deflectors 230 provided two-dimensionally in the xy plane provide light that passes though all sites in the image 6. Therefore, the three-dimensional image may be viewed over a wide range. Because the display device is also capable of presenting light from a specific location in the xy plane that passes through sites throughout the image 6, the three-dimensional image is formed as a plane and not a point.

Figure 16:
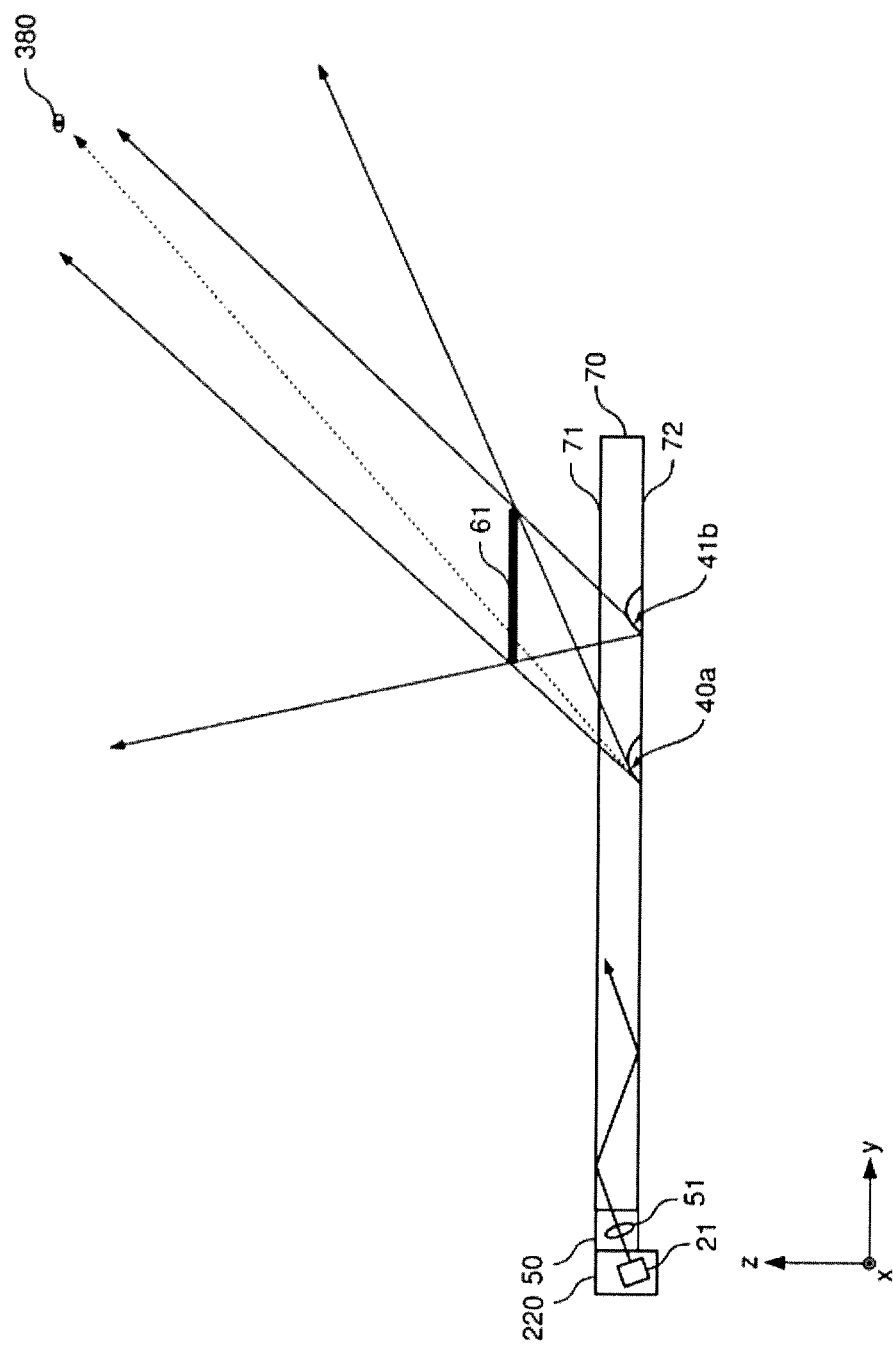
FIG. 16 illustrates the relationship between a reflection surface 40a, a reflection surface 41b, and an observation position 380.

FIG. 16 illustrates the relationship between a reflection surface 40a, a reflection surface 41b, and an observation position 380. The reflection surface 40a is configured so that any of the light rays in the light emitted from the emission surface 71 via the reflection surfaces 40 pass through the observation position 380. The reflection surface 41b is configured so that any of the light rays in the light emitted from the emission surface 71 via the reflection surfaces 40 pass through the observation position 380. Whereas, no reflection surfaces are provided in the display device 200 at location where the light would not pass through the observation position 380. Thus, each of the reflection surfaces 40, 41 in the plurality of reflection surfaces 40, 41 is configured so that any of the light rays in the light emitted from the emission surface 71 via the reflection surfaces 40, 41 pass through a specific observation position 380 in a space. Consequently, it is possible to reduce the surface area of the region in the light guide plate 70 where the reflection surfaces 40 must be formed, similar to the display device 10 in the first embodiment and the modifications thereto.

Figure 17:
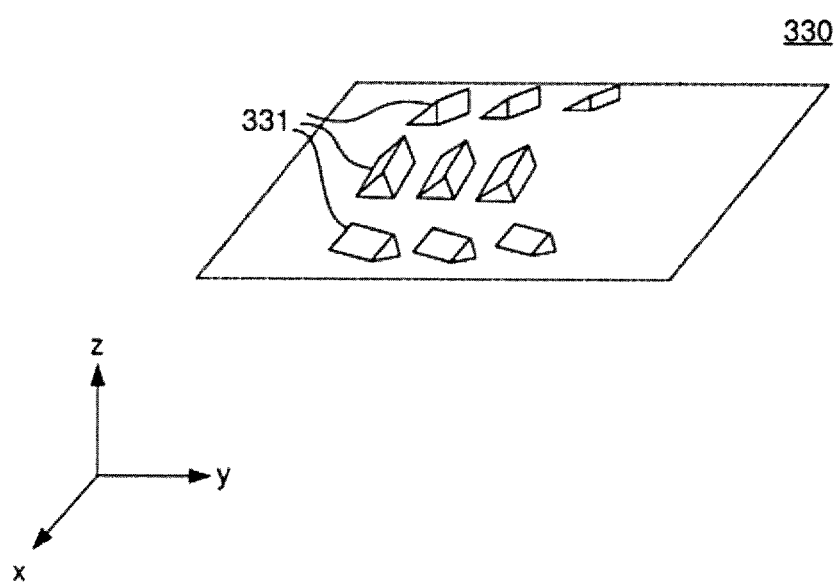
FIG. 17 is a schematic view of a deflector 330 as a comparative example of the deflector 230.

FIG. 17 is a schematic view of a deflector 330 as a comparative example of the deflector 230. The deflector 330 includes a plurality of optical elements 331 provided at separate locations. The optical elements 331 each possess a single flat reflection surface. The reflection surfaces in the optical elements 331 each reflect light incident thereon toward mutually different points in the image 6.

The optical elements 331 may all be provided separately, or may be provided where a portion thereof are connected. The distribution pattern for the optical elements 331 may be different in accordance with the location at which deflectors 330 are provided.

Figure 18:
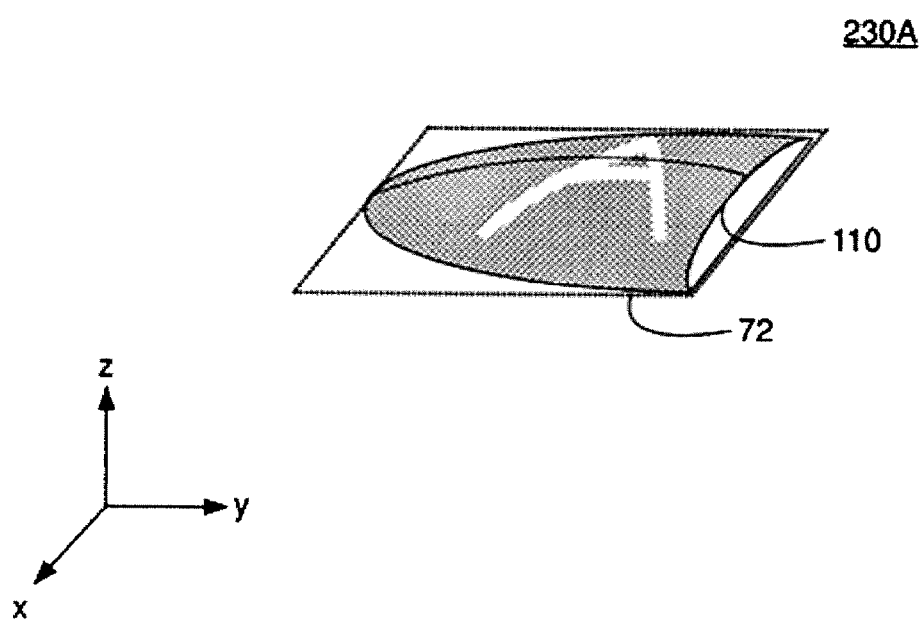
FIG. 18 is a schematic perspective view of a deflector 230A as a comparative example of the deflector 230.

FIG. 18 is a schematic perspective view of a deflector 230A as a comparative example of the deflector 230; the deflector 230A possesses an entirely convex reflection surface. The deflector 230A is provided on the rear surface 72 of the light guide plate 70. The convex reflection surface of the deflector 230A deflects the light guided through the light guide plate 70 so that the light beams passing through the plane 9 which includes the image 6 exit from the emission surface 71.

The portions of the deflector 230A that do not correspond to creating the character 'A' are provided with an anti-reflective film 110. The light entering at portions where the anti-reflective film 110 is formed on the deflector 230A does not substantially reflect therefrom. Only the light entering at portions with no anti-reflective film 110 on the deflector 230A reflect therefrom. Thus, the deflector 230A deflects light entering therein so that the light beams passing through the character 'A' of the image 6 exit from the emission surface 71. The anti-reflective film 110 may be produced, for instance, by coating areas of the rear surface 72 that do not correspond to the area forming the character 'A' with black paint material. The anti-reflective film 110 may be produced by printing areas that do not correspond to the area forming the character 'A' with black paint material. Because the deflectors 230A may be created by printing the black paint material after forming the convex portion on the light guide plate 70, this simplifies the process of producing the deflectors.

Figure 19:
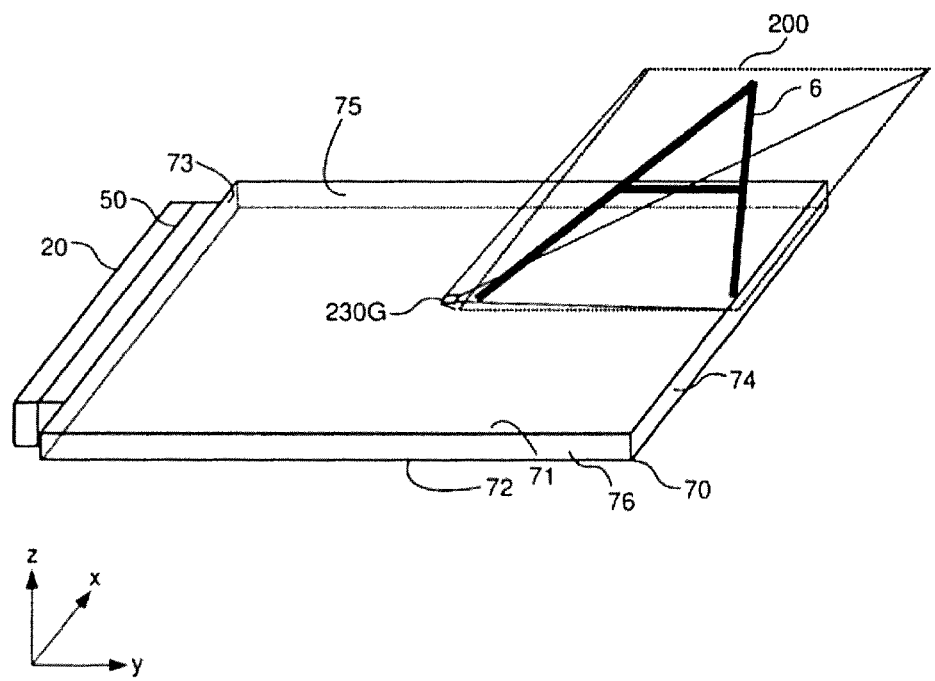
FIG. 19 is for describing how a deflector 230G is formed as a comparison with the deflector 230A.
Figure 20A:
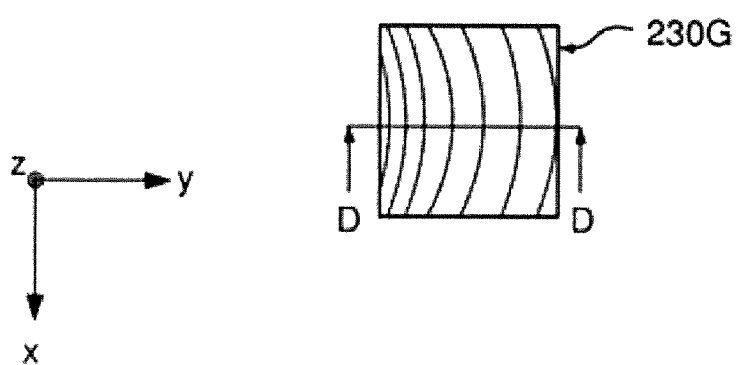
FIGS. 20A and 20B are for describing how a deflector 230G is formed as a comparison with the deflector 230A.
Figure 20B:
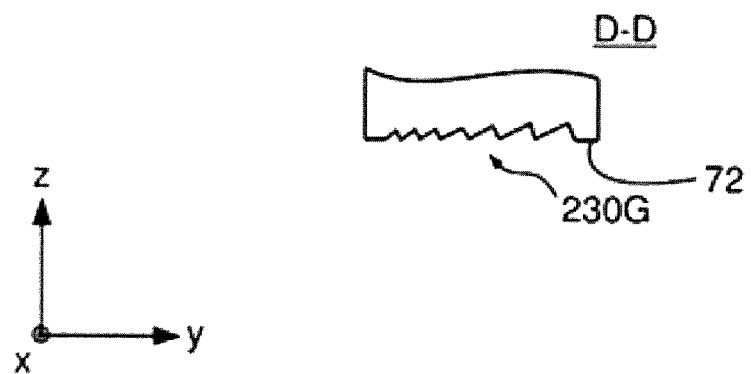

FIG. 19, FIG. 20A, and FIG. 20B are for describing how a deflector 230G is formed as a comparison with the deflector 230A. The deflector 230G may be provided as a portion of a Fresnel lens.

The optical surfaces forming the Fresnel lens are provided on the rear surface 72 of the light guide plate 70 for each deflector 230. FIG. 20A and FIG. 20B illustrate when a Fresnel lens is created for a single deflector 230G. The Fresnel lens portion in each of the deflectors 230 deflects light guided through the light guide plate 70 so that the light beams passing through the plane 9 which contain the image 6 exit from the emission surface 71.

Figure 21A:
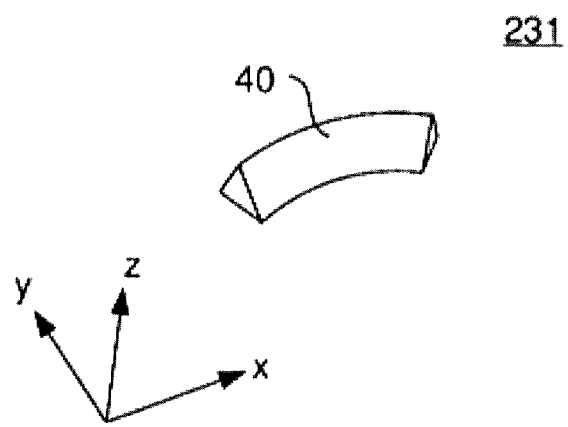
FIGS. 21A, 21B, and 21C schematically illustrate additional examples for the shape of an optical element 231.
Figure 21B:
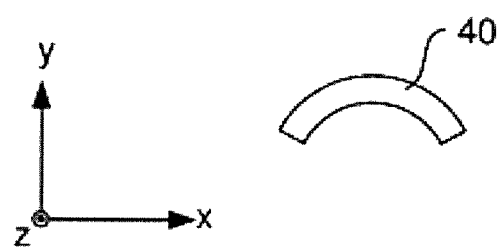
Figure 21C:
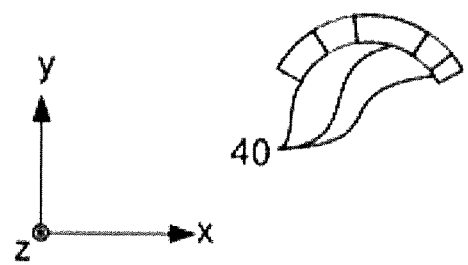

FIGS. 21A, 21B, and 21C schematically illustrate additional examples for the shape of an optical element 231; FIG. 21A is a perspective view of an optical element 231; and FIG. 21B illustrates when the reflection surface 40 is projected onto the xy plane. When the reflection surface 40 is projected onto the xy plane, the outer shape in the positive y axis direction and the outer shape toward the negative y axis direction which outline the reflection surface 40 are concentric arcs. The outer shape in the negative y axis direction of the reflection surface 40 projected onto the xy plane may be referred to as the front outline while the outer shape toward the positive y axis direction is referred to as the rear outline. The front outline and the rear outline of the reflection surface 40 form concentric arcs.

If cut along a plane parallel to the zy plane, the line of intersection between the optical element 231 illustrated in FIG. 21A and FIG. 21B and the reflection surface 40 is a straight line. However, because the front outline and the rear outline are curved, the reflection surface 40 in FIG. 21 is a curved surface. Therefore, a single reflection surface 40 can present the light needed to create a line or a plane forming at least a portion of the image.

FIG. 21C schematically illustrates additional examples for the shape of the reflection surface of an optical element 231. FIG. 21C illustrates the shape of a reflection surface 40 projected onto the xy plane. As can be seen in FIG. 21C the front outline and a rear outline forming the concentric arcs outlining the reflection surface 40 are partitioned to provide a reflection surface 40 separated into a plurality of sections.

Figure 22A:
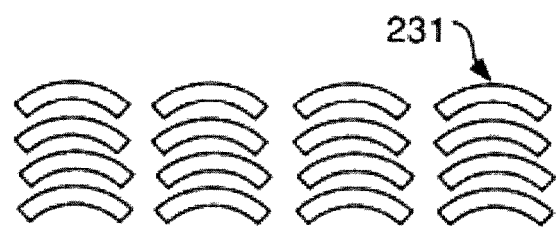
FIGS. 22A, 22B, and 22C schematically illustrate examples for distributing optical elements 231 in the xy plane.
Figure 22B:
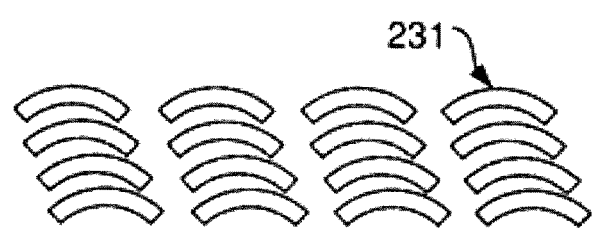
Figure 22C:
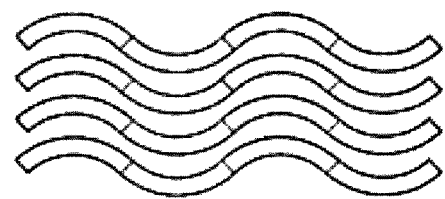

FIGS. 22A, 22B, and 22C schematically illustrate examples for distributing optical elements 231 in the xy plane. FIG. 22A illustrates an example where a plurality of optical elements 231 form a line along they axis direction. FIG. 22B is a modified version of the example in FIG. 22A, and illustrates an example where the optical elements 231 are distributed so that when the optical elements 231 aligned along the y axis direction are viewed in order, the same are shifted along the x axis direction by a fixed offset. FIG. 22C illustrates an example where the optical elements 231 are distributed continuously as a single element along the x axis direction. In FIG. 22C the end portions of optical elements adjacent in the x axis direction are connected to provide a single optical element. The dashes in FIG. 22C corresponds to the end portions of adjacent optical elements in the x axis direction.

Figure 23A:
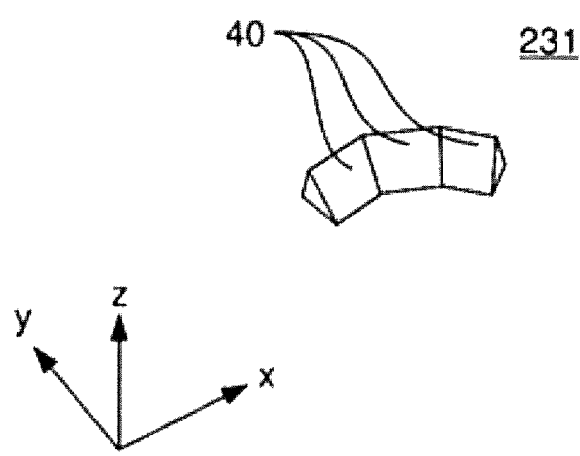
FIGS. 23A and 23B schematically illustrates additional examples for the shape of the reflection surface of an optical element 231.
Figure 23B:
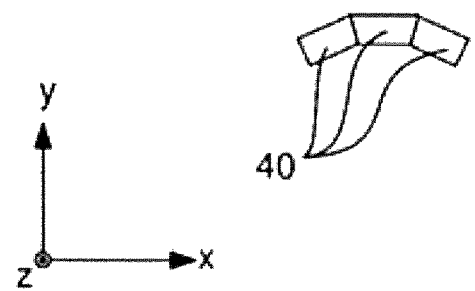

FIGS. 23A and 23B schematically illustrate additional examples for the shape of the reflection surface of an optical element 231. FIG. 23A is a perspective view of an optical element 231; and FIG. 23B illustrates when the reflection surface 40 of the optical element 231 is projected onto the xy plane. The optical element 231 is created from three planes with mutually different normal line directions. When the reflection surface 40 is projected onto the xy plane, each of the front outlines and the rear outlines form three polygonal lines that extend in different directions. Because the reflection surface 40 illustrated in FIG. 23 is flat, the light entering each of the reflection surfaces 40 is oriented in three mutually different directions. Therefore, the optical element 231 illustrated in FIGS. 23A, 23B can present light that creates three points which are a portion of the image.

Figure 24A:
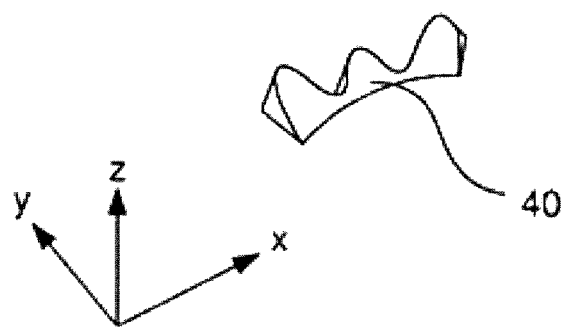
FIGS. 24A and 24B schematically illustrates various examples for the shape of the reflection surface of an optical element 231.
Figure 24B:
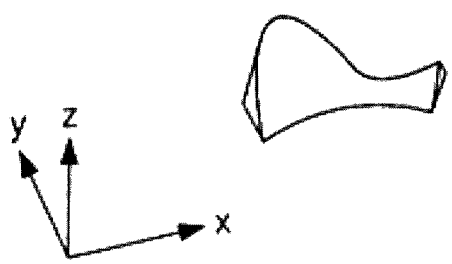

FIGS. 24A and 24B schematically illustrate additional examples for the shape of the reflection surface of an optical element 231. The reflection surfaces 40 in the optical element 231 illustrated in FIG. 24A and FIG. 24B differ from the optical element 231 illustrated in FIG. 21(a); that is, the ridges of the reflection surface 40 toward the positive z axis have different heights in the z-axis direction. When projected onto the xz plane, the ridge of the reflection surface 40 toward the positive z axis changes continually along the x axis direction When cut along a plane parallel to the yz plane the linear length of the reflection surface 40 changes along the x axis direction. The intensity of light reflected from the reflection surface 40 therefore changes along the x axis direction. Consequently, the optical element 231 illustrated in FIG. 24A and FIG. 24B can present light for creating an image of lines where the luminance thereof changes along the x direction.

The display device 210 and the modifications thereto described with reference to FIG. 12 through FIG. 24B are configured such that each of the optical deflectors provided two dimensionally in a plane parallel to the emission surface of the light guide plate 70 supply light forming images at a plurality of locations in the three-dimensional image. Therefore, the three-dimensional image may be viewed over a wide range. At least a portion of the three-dimensional image may also be formed as a plane and not necessarily as a point. Additionally, as described with reference to FIG. 16, the deflectors 230 are configured such that any of the light rays in the light exiting from each of the deflectors 230 pass through the observation position 380. This therefore reduces the surface area of the region on the light guide plate 70 whereon the reflection surfaces 40 are formed.

Thus, each of the reflection surfaces 40, 41 in the plurality of reflection surfaces 40, 41 is configured so that any of the light rays in the light emitted from the emission surface 71 via the reflection surfaces 40, 41 pass through a specific observation position 380 in a space. Consequently, it is possible to reduce the surface area of the region in the light guide plate 70 where the reflection surfaces 40 must be formed, similar to the display device 10 in the first embodiment and the modifications thereto.

Figure 25:
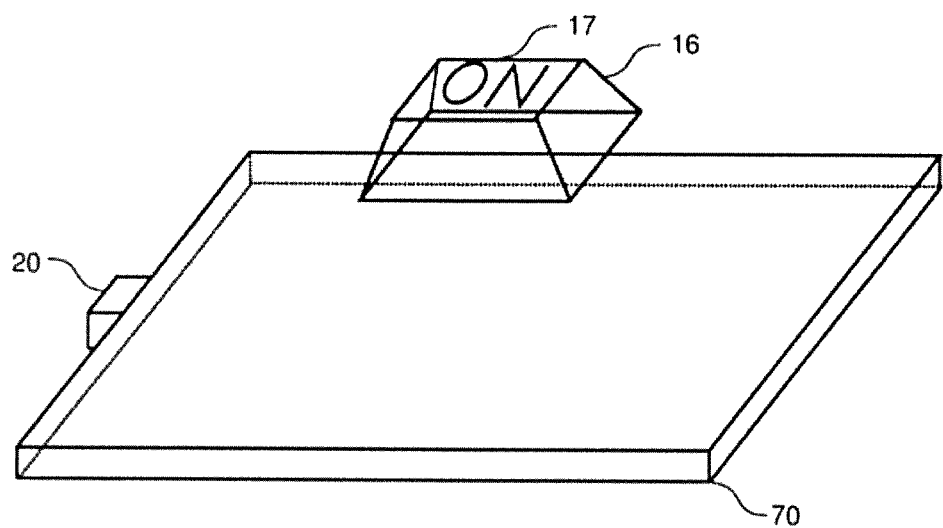
FIG. 25 is a schematic view of an image 16 formed by a display device 2010 as a comparative example of the display device 10.

FIG. 25 is a schematic view of an image 16 formed by a display device 2010 as a comparative example of the display device 10. The image 16 represents a button; the image 16 includes a segment image 17 representing an input surface that can be perceived in a space. A sensor for detecting the proximity of an object to the segment image 17 may be used with the display device 2010 to provide an operational input device that serves as a virtual switch. This operational input device may be used as the input device for an ATM or an automotive instrument panel, or the like. The location of the eyes of a user of an ATM or an automotive device is substantially fixed. Therefore, the deflectors in the display device 2010 may be designed in accordance with an observation position as described above. Thus, this reduces the surface area of the region whereon the deflectors 30 must be formed.

Note that a display device configured identically to the display device 10 and the modification examples therefor, the display device 210 and the modification examples therefor, is not limited to a game machine, an ATM, or an instrument panel. The display device may be adopted as a dashboard display device, or in place of the door mirror for automotive settings.

The present invention is hereby described by way of the embodiments; however, the technical scope of the present invention is not limited to the above-described embodiments. It is obvious to a person skilled in the art that the above described embodiments can be modified or improved in various ways. The scope of the claims makes it clear whether such kinds of modifications or improvements to the embodiments are within the technical scope of the present invention.

It should be noted that unless explicitly stated with terms such as "before", "prior to", and the like, and unless the output of a prior process is used in a subsequent process, the sequence of execution of operations procedures, steps, and stages within the devices, systems, programs, and methods expressed in the scope of the claims, the specification, and the drawings, may be executed any order as desired. The terms "first", "next", and the like are used for convenience when describing operational flows within the scope of the claims, the specification, and in the drawings, and does not mean that execution in this order is required.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical device comprising:
 a light guide plate configured to guide light within a plane parallel to an emission surface; and
 a plurality of deflectors configured to deflect light guided thereto by the light guide plate, causing light forming an image in a space outside the light guide plate to exit from the emission surface,
 wherein each deflector in the plurality of deflectors cause the light to exit from the emission surface toward a direction converging onto a single convergence point or convergence line in the space, or to radiate from a single convergence point or convergence line in the space,
 wherein the convergence point or the convergence line is mutually different among the plurality of deflectors with a grouping of a plurality of the convergence points or the convergence lines forming the image in the space,
 wherein each deflector in the plurality of deflectors is configured such that any of the light rays in the light emitted from the emission surface via the deflector passes through a specific observation position in the space, wherein at least one of the deflectors among the plurality of deflectors is configured such that given a first line connecting one edge of the deflector and the convergence point or convergence line and a second line connecting the convergence point or the convergence line to the observation position, the first line is located between where the second line or an extension thereof intersects with the light guide plate and the one edge of said deflector so that the first line and the second line form no more than a predetermined angle within a plane orthogonal to the direction along which light is guided by the light guide plate, wherein at least one of the deflectors in the plurality of deflectors includes a first segment near one edge and the second segment near the other edge, the first segment and the second segment situated about a position corresponding to the optical axis of light converging toward or radiating from the convergence point or convergence line in a plane orthogonal to the direction along which light is guided by the light guide plate, and wherein the light emitted from the first segment and the light emitted from the second segment are asymmetrical about the optical axis.

2. The optical device according to claim 1, wherein each deflector in the plurality of deflectors is configured such that given a third line connecting another edge of the at least one deflector and the convergence point or convergence line, the third line is located between where the second line or an extension thereof intersects with the light guide plate and the other edge of the deflector so that the third line and the second line form no more than a predetermined angle within a plane orthogonal to the direction along which light is guided by the light guide plate.

3. The optical device according to claim 2, wherein the plurality of deflectors is formed along a predetermined line within a plane parallel to the emission surface.

4. The optical device according to claim 2,
wherein the length of the first segment in a direction parallel to the emission surface and the length of the second segment in a direction parallel to the emission surface are asymmetrical in a plane orthogonal to the direction along which light is guided by the light guide plate.

5. The optical device according to claim 1, wherein the plurality of deflectors is formed along a predetermined line within a plane parallel to the emission surface.

6. The optical device according to claim 5,
wherein the length of the first segment in a direction parallel to the emission surface and the length of the second segment in a direction parallel to the emission surface are asymmetrical in a plane orthogonal to the direction along which light is guided by the light guide plate.

7. The optical device according to claim 1,
wherein the length of the first segment in a direction parallel to the emission surface and the length of the second segment in a direction parallel to the emission surface are asymmetrical in a plane orthogonal to the direction along which light is guided by the light guide plate.

8. The optical device according to claim 1, wherein:
the light guided by the light guide plate is parallel in a plane parallel to the emission surface;
the first segment and the second segment each include a plurality of deflection surfaces configured to deflect light incident thereon; and the plurality of deflection surfaces in the first segment and the plurality of deflection surfaces in the second segment are oriented asymmetrically about a position corresponding to a line connecting the convergence point or a convergence line and the observation position.

9. The optical device according to claim 1, wherein:
the degree of said asymmetry for a deflector located near one edge of the light guide plate is greater than the degree of said asymmetry for a deflector located near the center of the light guide plate.

10. The optical device according to claim 1, further comprising: a light source configured to emit light that is guided by the light guide plate.

11. An optical device comprising:
a light guide plate configured to guide light within a plane parallel to an emission surface; and
a plurality of deflectors arranged two-dimensionally in a plane parallel to the emission surface and each deflector configured to deflect light guided thereto by the light guide plate, causing light forming an image in a space to exit from the emission surface;
wherein:
each deflector in the plurality of deflectors is configured to spread the light incident thereon into light with an intensity distribution corresponding to the image in a direction orthogonal to the light guide direction of the light guide plate in a plane parallel to the emission surface and cause the emission surface to output said light such that grouping the light from a plurality of the deflectors arranged along a direction orthogonal to the light guide direction thereby forms the light radiating from the image;
each deflector in the plurality of deflectors is configured such that any of the light rays in the light emitted from the emission surface via the deflector passes through a specific observation position in the space;
at least one of the deflectors in the plurality of deflectors includes a first segment near one edge and the second segment near the other edge, the first segment and the second segment situated about a position corresponding to the optical axis of light converging toward or radiating from the convergence point or convergence line in a plane orthogonal to the direction along which light is guided by the light guide plate; and
the light emitted from the first segment and the light emitted from the second segment are asymmetrical about the optical axis.

12. The optical device according to claim 11, wherein: one deflector among the plurality of deflectors is provided on a line or an extension thereof that connects any point in the image and the observation position.

13. An optical device comprising:
a light guide plate configured to guide light within a plane parallel to an emission surface; and
a plurality of deflectors arranged two-dimensionally in a plane parallel to the emission surface and each deflector configured to deflect light guided thereto by the light guide plate, causing light forming an image in a space to exit from the emission surface;
wherein:
each deflector in the plurality of deflectors is configured to spread the light incident thereon two-dimensionally into light with an intensity distribution corresponding to the image and cause the emission surface to output said light such that grouping the light from three or more deflectors arranged on different straight lines thereby forms the light radiating from the image;

each deflector in the plurality of deflectors is configured such that any of the light rays in the light emitted from the emission surface via the deflector passes through a specific observation position in the space, wherein at least one of the deflectors in the plurality of deflectors includes a first segment near one edge and the second segment near the other edge, the first segment and the second segment situated about a position corresponding to the optical axis of light converging toward or radiating from the convergence point or convergence line in a plane orthogonal to the direction along which light is guided by the light guide plate, and wherein the light emitted from the first segment and the light emitted from the second segment are asymmetrical about the optical axis.

14. The optical device according to claim 13, wherein: each deflector in the plurality of deflectors includes one or a plurality of groups of deflection surfaces inclined relative to the emission surface on the outer surface or on the inside of the light guide plate and is configured to reflect, refract, or diffract light guided thereto by the light guide plate.

15. The optical device according to claim 14, wherein: at least one of the deflection surfaces includes a plurality of flat or curved surfaces oriented in different directions.

16. The optical device according to claim 14, wherein: at least one of the deflection surfaces is extended, bent, or curved in a direction orthogonal to the light guide direction of the light guide plate when the deflection surface is projected onto a surface parallel to the emission surface.

* * * * *